(12) United States Patent
Bar et al.

(10) Patent No.: US 11,571,799 B2
(45) Date of Patent: Feb. 7, 2023

(54) LOCKING MECHANISM AND SAFETY LATCH FOR MULTI-PURPOSE APPARATUS

(71) Applicant: C. B. Innovation Ltd., Kibbutz Maayan Tzvi (IL)

(72) Inventors: Yaniv Bar, Nofit (IL); Yaniv Ofir, Kibbutz Givat Chaim Ichud (IL)

(73) Assignee: C. B. Innovation Ltd., Kibbutz Maayan Tzvi (IL)

(*) Notice: Subject to any disclaimer, the term of this patent is extended or adjusted under 35 U.S.C. 154(b) by 339 days.

(21) Appl. No.: 17/019,269

(22) Filed: Sep. 13, 2020

(65) Prior Publication Data

US 2020/0406442 A1 Dec. 31, 2020

Related U.S. Application Data

(63) Continuation-in-part of application No. PCT/IL2019/050353, filed on Mar. 27, 2019, and a
(Continued)

(30) Foreign Application Priority Data

Jun. 15, 2015 (IL) .......................................... 239432

(51) Int. Cl.
*B25F 1/04* (2006.01)
*B25F 1/00* (2006.01)
(Continued)

(52) U.S. Cl.
CPC ................ *B25F 1/04* (2013.01); *A01B 1/022* (2013.01); *A01B 1/20* (2013.01); *B25F 1/006* (2013.01); *B26B 23/00* (2013.01); *B25G 1/08* (2013.01)

(58) Field of Classification Search
CPC . B25F 1/04; B25F 1/006; A01B 1/022; A01B 1/20; B26B 23/00
See application file for complete search history.

(56) References Cited

U.S. PATENT DOCUMENTS

| 5,103,520 A | 4/1992 | Mazzo |
| 2004/0174700 A1 | 9/2004 | Zirk |

FOREIGN PATENT DOCUMENTS

WO 2016203355 A1 2/2016

OTHER PUBLICATIONS

International Search Report in PCT/IL2019/050353, dated Jun. 23, 2019.
(Continued)

*Primary Examiner* — David B. Thomas

(57) ABSTRACT

Locking mechanism and safety latch for multi-purpose apparatus. The apparatus includes at least a first tool and a second tool. Each tool can rotate between open position and closed position. The locking mechanism includes a rotatable elongated lever, connected perpendicularly to a locking bar. The mechanism is switchable among at least: a first position in which the mechanism holds or locks in place both the first tool and the second tool when they are in closed positions; a second position in which the mechanism holds or locks in place both the first tool and the second tool when the first tool is in open position and the second tool is in closed position; a third position in which the mechanism holds or locks in place both the first tool and the second tool when the first tool is in closed position and the second tool is in open position.

20 Claims, 26 Drawing Sheets

Related U.S. Application Data continuation-in-part of application No. 15/572,787, filed as application No. PCT/IB2016/053462 on Jun. 13, 2016, now Pat. No. 10,994,400.

(60) Provisional application No. 62/649,640, filed on Mar. 29, 2018, provisional application No. 62/295,148, filed on Feb. 15, 2016.

(51) Int. Cl.
*A01B 1/20* (2006.01)
*A01B 1/02* (2006.01)
*B26B 23/00* (2006.01)
*B25G 1/08* (2006.01)

(56) References Cited

OTHER PUBLICATIONS

Written Opinion of the International Searching Authority in PCT/IL2019/050353, dated Jun. 23, 2019.

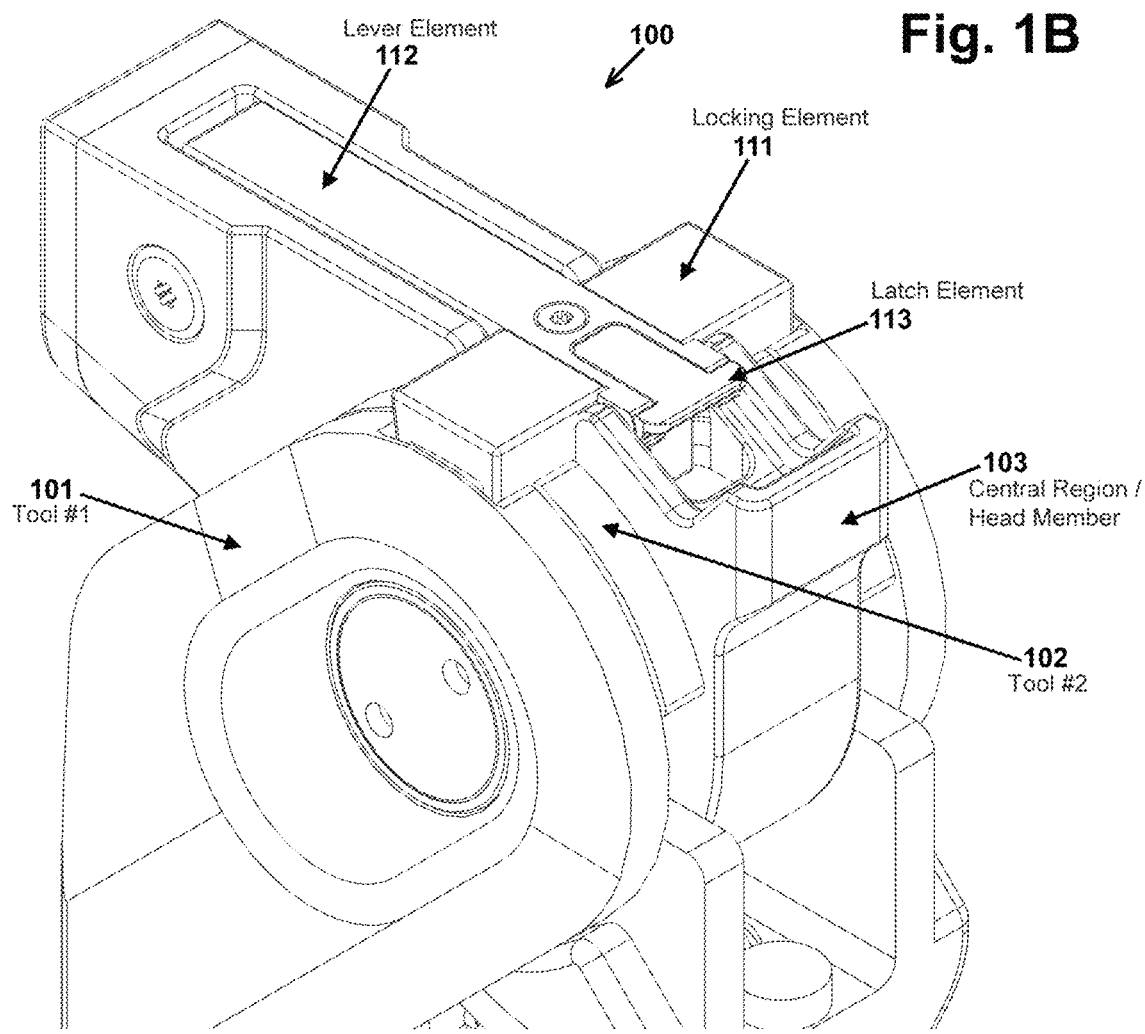

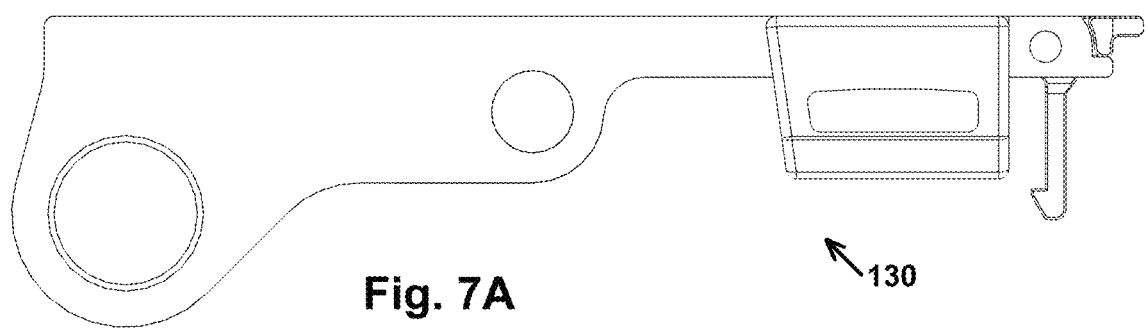
Fig. 7A ↖130
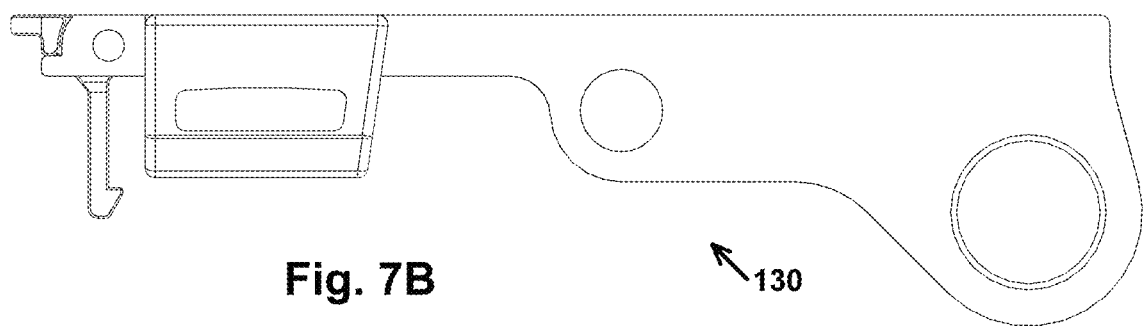
Fig. 7B ↖130

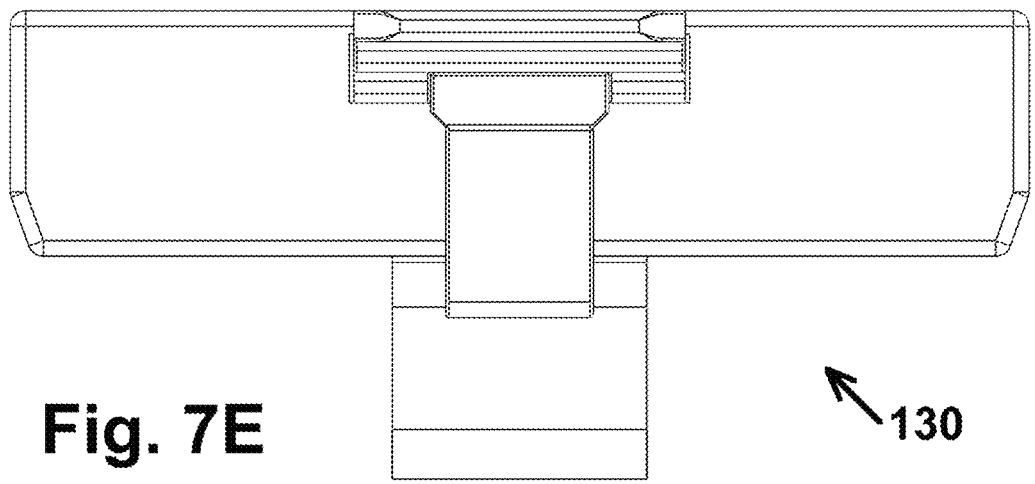
Fig. 7E ↖130
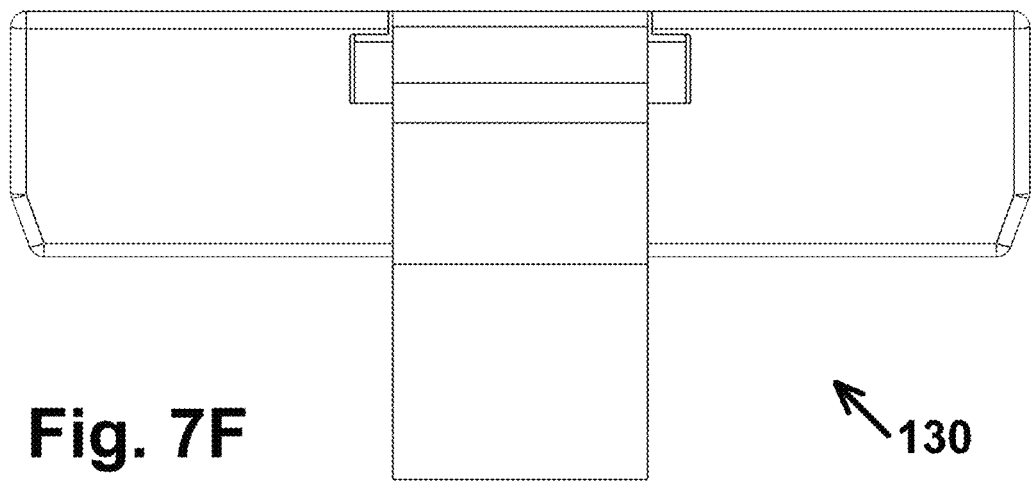
Fig. 7F ↖130

US 11,571,799 B2

LOCKING MECHANISM AND SAFETY LATCH FOR MULTI-PURPOSE APPARATUS

CROSS-REFERENCE TO RELATED APPLICATIONS

This patent application is a Continuation-in-Part (CIP) of PCT international application number PCT/IL2019/050353, having an international filing date of Mar. 27, 2019, published as international publication number WO 2019/186556 A1, which is hereby incorporated by reference in its entirety; which claims benefit and priority from U.S. 62/649,640, filed on Mar. 29, 2018, which is hereby incorporated by reference in its entirety.

This patent application is also a Continuation-in-Part (CIP) of U.S. Ser. No. 15/572,787, filed on Nov. 9, 2017, which is hereby incorporated by reference in its entirety.

The above-mentioned U.S. Ser. No. 15/572,787 is a National Stage of PCT international application number PCT/IB2016/053462, having an international filing date of Jun. 13, 2016, published as international publication number WO 2016/203355 A1, which is hereby incorporated by reference in its entirety.

The above-mentioned PCT international application number PCT/IB2016/053462 claims priority and benefit from (i) Israeli patent application number IL 239432, filed in the Israeli patent office on Jun. 15, 2015, which is hereby incorporated by reference in its entirety; and from (ii) U.S. provisional patent application No. 62/295,148, filed in the United States patent office on Feb. 15, 2016, which is hereby incorporated by reference in its entirety.

FIELD

The present invention relates to the field of mechanical tools.

BACKGROUND

Millions of users utilize various types of mechanical tools, in everyday life as well as for particular projects. For example, utensils (fork, spoon, knife) are often used for eating food, all over the world. Similarly, a person may use a screwdriver in order to assemble a toy, or may utilize a bottle opener in order to open a sealed bottle of wine.

SUMMARY

The present invention comprises a locking mechanism and safety latch for a multi-purpose mechanical apparatus or for a multi-purpose mechanical tool.

The present invention may provide other and/or additional benefits and/or advantages.

BRIEF DESCRIPTION OF THE DRAWINGS

FIGS. 1A and 1B are perspective illustrations of a top-portion of a multi-purpose apparatus, in accordance with some demonstrative embodiments of the present invention.

FIGS. 7A to 7F are side-view illustrations of a locking mechanism of a multi-purpose apparatus, in accordance with some demonstrative embodiments of the present invention.

DESCRIPTION OF SOME DEMONSTRATIVE EMBODIMENTS OF THE INVENTION

Figure 1A:
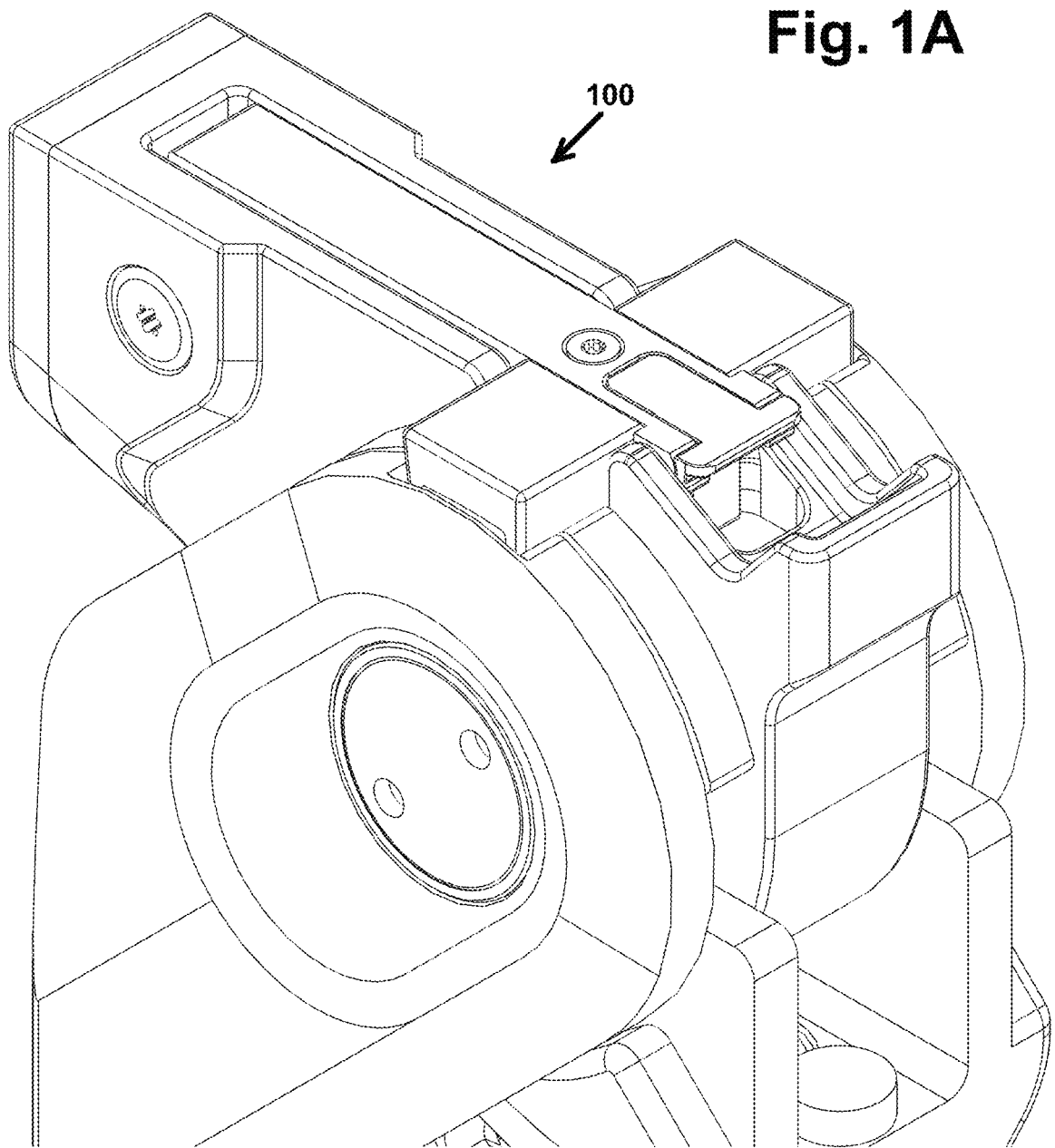

The present invention may comprise a locking mechanism and/or a safety mechanism for a multi-purpose apparatus that includes two or more tools, such as, a hammer or a folding hammer, a folding or foldable axe, a folding or foldable spade, a folding or foldable shovel, a storage compartment in a hollow elongated handle, and/or other tools which may be in an operational position or in a non-operational position.

As the user selectively folds and/or unfolds (or rotates) one or more of the tools, or as the user selectively makes one or more of the tools accessible or operational while also making one or more other tools non-accessible or non-operational, the locking mechanism of the present invention enables one or more of the tools of the multi-purpose apparatus to remain secured and/or trapped and/or in a fixed position and/or in a non-operational position, while also simultaneously enabling one or more other tools of the multi-purpose apparatus to remain in a fixed operational position.

The present invention may further comprise a locking mechanism and/or a safety latch (or a safety catch, or a safety mechanism) for a multi-purpose tool, such as for the multi-purpose device as described above and/or as depicted in any of the drawings, as well as for other suitable types of multi-purpose devices.

For example, a self-adjusting, self-aligning and/or adaptive locking mechanism may be comprised in the multi-purpose tool, and operates as a positive rotational lock of two or more elements or tools of the multi-purpose tool, relative to a center or relative to a central point or a central axis or relative to another point-of-reference or axis-of-reference or line-of-reference or element-of-reference, such as relative to a head region or head area or monolithic head element of the multi-purpose tool.

The locking mechanism may comprise, for example, a trapezoid or generally-trapezoid bar or member, which operates as a wedge; and a holding arm that rotates the wedge in and out of the locking position. The trapezoid bar is mated or connected to the arm with an ability to move or play in one or more particular directions; for example, in X and Y directions, as well as yaw, pitch, and roll. These particular play or degrees of freedom allow the lock trapezoid bar to orient or self-adjust itself (e.g., in response to a manual general movement of the bar towards a locking state) to the best or most efficient or most stable locking position, and enables the locking mechanism to autonomously guide itself or self-guide into a locked position with fine-tuning of its position or location via the degrees of freedom that it has. The positive lock, or a latch or catch element, is secured by a spring (or by other suitable connecting element), that is polling on the arm and in turn transfers a locking force in (or along) the Y axis.

In a demonstrative embodiment, the locking mechanism may comprise (or may be formed of) multiple components, which may cooperate together in order to simultaneously lock at a suitable position and relative to a central region (e.g., relative to the monolithic head region of the multi-purpose tool) two or more tools of the multi-purpose tool (e.g., the axe and the shovel; or the axe and the spade; or the axe and the hammer; or the hammer and the spade; or the hammer and the shovel; or the like). In addition to locking and maintaining the two (or more) tools at their locked position, the locking mechanism further operates to prevent accidental or non-desired release or movement of such tool(s) out of their locked position, such as due to forces that are applied on the multi-purpose tool and/or due to rigid utilization of the multi-purpose tool (e.g., hammering, digging, shoveling, or the like).

In a demonstrative embodiment, the locking mechanism comprises a lever element, a locking element (or locking member), and a latch element (or latch member). In some embodiments, these three components are monolithically formed and integrated with each other and are non-separable from each other; whereas, in other embodiments, these three components may be firstly produced as three discrete components that are then inter-connected via screws, via a hinge, via a pivot, or other connection mechanism.

For example, the lever element may move or may rotate about its base or its narrow (or narrowest) edge, between (i) an open position in which the longest dimension of the lever element is generally parallel to the longest dimension of the multi-purpose tool, and (ii) a closed position in which the longest dimension of the lever element is generally perpendicular to the longest dimension of the multi-purpose tool.

The locking member may be a bar or rod or surface, forming a T-shape with the lever element, or forming a Cross shape with the lever element. The locking member is guided to its locking location and position via the movement (or pivoting, or rotation) of the level element. Upon reaching the locking position, the locking member tightly holds and/or tightly presses on at least two tools of the multi-purpose tool, and/or blocks the movement and/or blocks the release of at least two tools of the multi-purpose tool; such that those at least two tools of the multi-purpose tool are trapped or sandwiched or pressed or fixedly resting beneath or under the locking member, or between the locking member and a non-moving region of the multi-purpose tool (e.g., a non-moving region of the head region of the multi-purpose tool).

The particular set of degrees of freedom of the level element, enable the lever element, when guiding the locking element towards and into its final position, to collect or to slightly move those two (or more) tools towards a single point or region of the multi-purpose tool, and then enables the operation of one of the tools (e.g., the axe) while the other tool is fixedly held or fixedly maintained and is securely locked or trapped in its place without the ability to be released or to move therefrom (unless or until the latch element is released or opened, and the lever is opened or removed or is pivoted away, thereby removing the locking member from its locking position and releasing at least one or more of the locked tools).

In some embodiments, the locking member is inserted into or onto or through or via one or more complementing rail(s) of the front side of the lever, and such rail(s) hold the locking member in place while also providing to the locking member the ability to slightly move or to slightly adjust its position at certain directions, e.g., forward and backward, up and down, right and left, and combinations of such movements, thereby providing a floating or semi-floating or partially-floating locking member relative to the lever, and enabling the locking member to slightly shift or adjust its position or location or orientation in order to fixedly lock into place the two or more tools of the multi-purpose apparatus even if such two or more tools do not close or open precisely or entirely or all the way or even if there is a slight imperfection in such two or more tools. In some embodiments, optionally, one or more screws and/or rails may enable the locking member, on the one hand, to constantly remain attached to the lever, and on the other hand, to also be able to slightly move at any desired direction in order to achieve secure locking of two or more tools even if such tools are imperfect and/or even if such tools are slightly away from their ideal position for locking.

The Applicants have realized that a monolithic, T-shaped, combined lever-and-locking member may not suffice for achieving a secure locking mechanism for two or more tools while at the same time also enabling a slight adjustment of the locking mechanism to an imperfect tool or to an imperfect depression or nook or cranny of a tool. Rather, the Applicants have realized that a locking mechanism should advantageously be comprised of two discrete components, namely the locking member and the lever member, enabling two or more (or three or more) degrees of freedom of them relative to each other (and particularly of the locking member relative to the lever member), in order to enable the adaptive locking of two or more tools even at imperfect positions and/or with imperfect tools. The rigidity and non-movement of a monolithic T-shaped lever-and-locking element does not provide the flexibility or the adaptivity that the locking mechanism should have in order to properly function. Furthermore, a rigid monolithic T-shaped lever-and-locking element may even lead to the multi-purpose tool becoming stuck or non-operational, due to excessive rigidity of the locking mechanism and lack of any degree of freedom for fine-tuning or adjustment of movement sideways, or up and down, or left and right, or forward or backward. The Applicants have also realized that the unique non-monolithic structure of the locking mechanism, and the slight freedom of movement of the locking member relative to the lever member, enable the locking mechanism to be utilized with a variety of different tools of such a multi-purpose apparatus (e.g., axe, hammer, spade, shovel, or the like), even if such tools have different numbers of nooks or depressions (e.g., a single depression, two depressions, three depressions, or the like), and/or even if such tools have different locations of depression(s).

The latch element may be or may comprise a safety latch or safety catch, or a latch mechanism which may be shaped as a downwardly-extending protrusion or rod or bar which further has an inwardly-pointing tooth or protrusion or latch or bump; such that the latch is able to securely and fixedly hold to a complementing protrusion or to a complementing crater of a non-moving element (or region) of the multi-purpose tool, such as to a non-moving portion of the head region of the multi-purpose tool.

In some embodiments, optionally, the latch member may be able to pivot about its own axis or hinge, in order to facilitate the latching or the operation in which the latch member attaches or connects to a complementing depression or nook or cranny or region or holding member of the multi-purpose tool. In other embodiments, the latch member is fixed relative to the lever member and/or relative to the locking member; and the latch member need not pivot or rotate relative to its own base, in order to securely hold a complementing protrusion of the head region of the multi-purpose tool.

In addition to the locking member, the latch member further secures the two (or more) tools to their position, and further prevents or blocks such two (or more) tools from being released or from moving; and/or the latch member may further secure the locking member to remain in its locking position; and/or the latch member may further secure (directly or indirectly) the lever member from pivoting away from its locking position; and/or the latch member further secures the entirety of the locking mechanism (e.g., including also the lever member and the locking member) from accidentally or unintentionally moving or being released, by accident or due to the application of forces on the multi-purpose apparatus (e.g., due to hammering operations, shoveling or digging operations, or the like).

Reference is made to FIGS. 1A and 1B, which are perspective illustrations of a top-portion of a multi-purpose apparatus 100, in accordance with some demonstrative embodiments of the present invention. FIG. 1A shows the top-portion of the multi-purpose apparatus 100 in a "clean" version without pointing out its component, in order to provide an unobstructed view of the various elements; whereas FIG. 1B shows the top-portion of the multi-purpose apparatus 100 with assisting numerals and arrows.

For demonstrative purposes, there are shown a first tool 101 and a second tool 102 of the multi-purpose apparatus 100, which may be locked or secured or fixedly maintained (or conversely, become released, or switched among). At or near, or adjacent to, or in proximity to, or on top of, a central region/head member 103 of the apparatus 100, there are installed a locking element 111, a lever element 112, and a latch element 113. It is noted that their shapes and/or dimensions and/or aspect ratio(s) may be, for example, as depicted in the drawing(s); or may be different from those depicted, as long as these elements are capable of performing their functions as described above and/or herein.

Figure 1C:
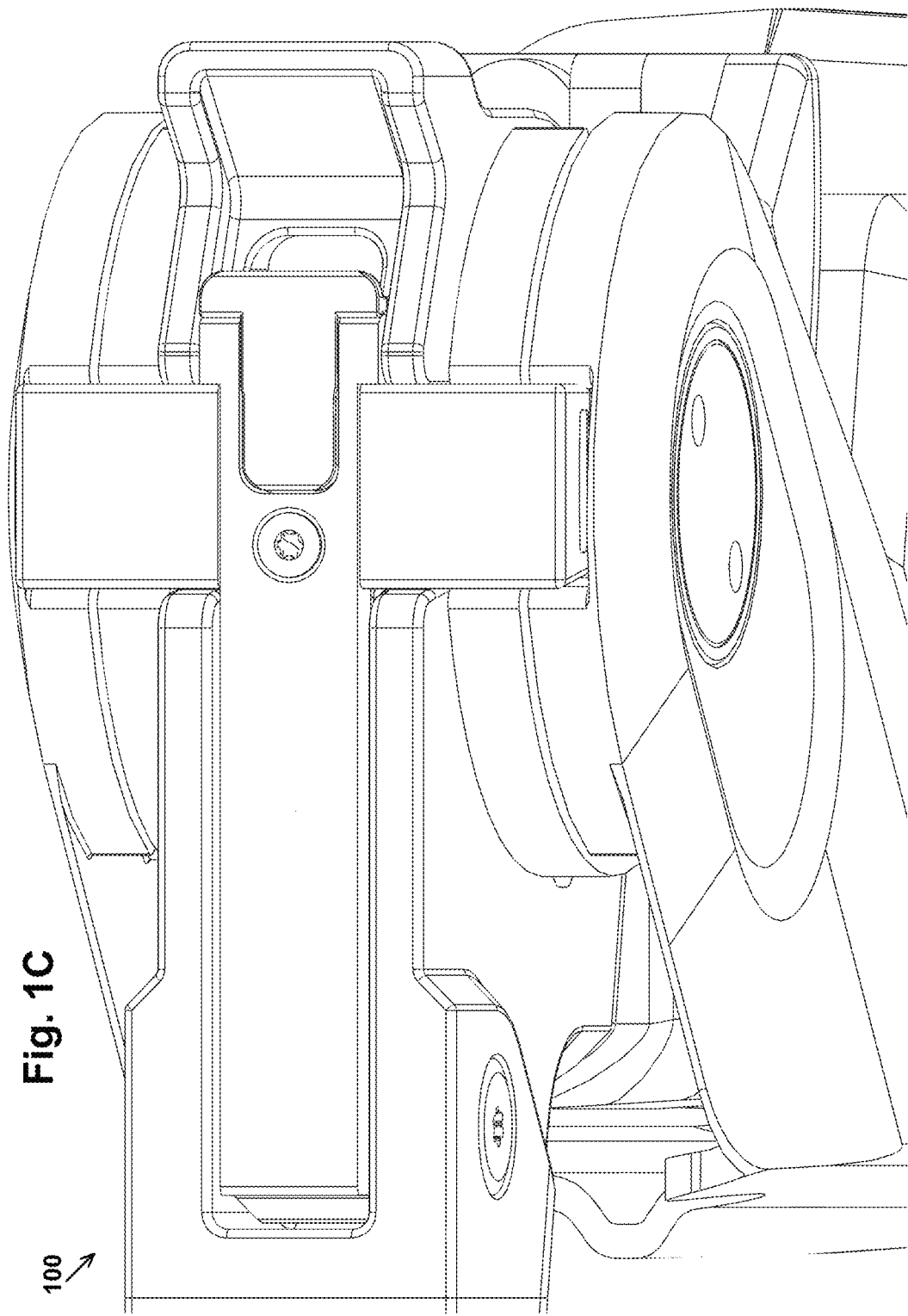
FIG. 1C is a top perspective illustration of a top-portion of the multi-purpose apparatus, in accordance with some demonstrative embodiments of the present invention.

Reference is made to FIG. 1C, which is a top perspective illustration of a top-portion of the multi-purpose apparatus 100, in accordance with some demonstrative embodiments of the present invention.

Figure 1D:
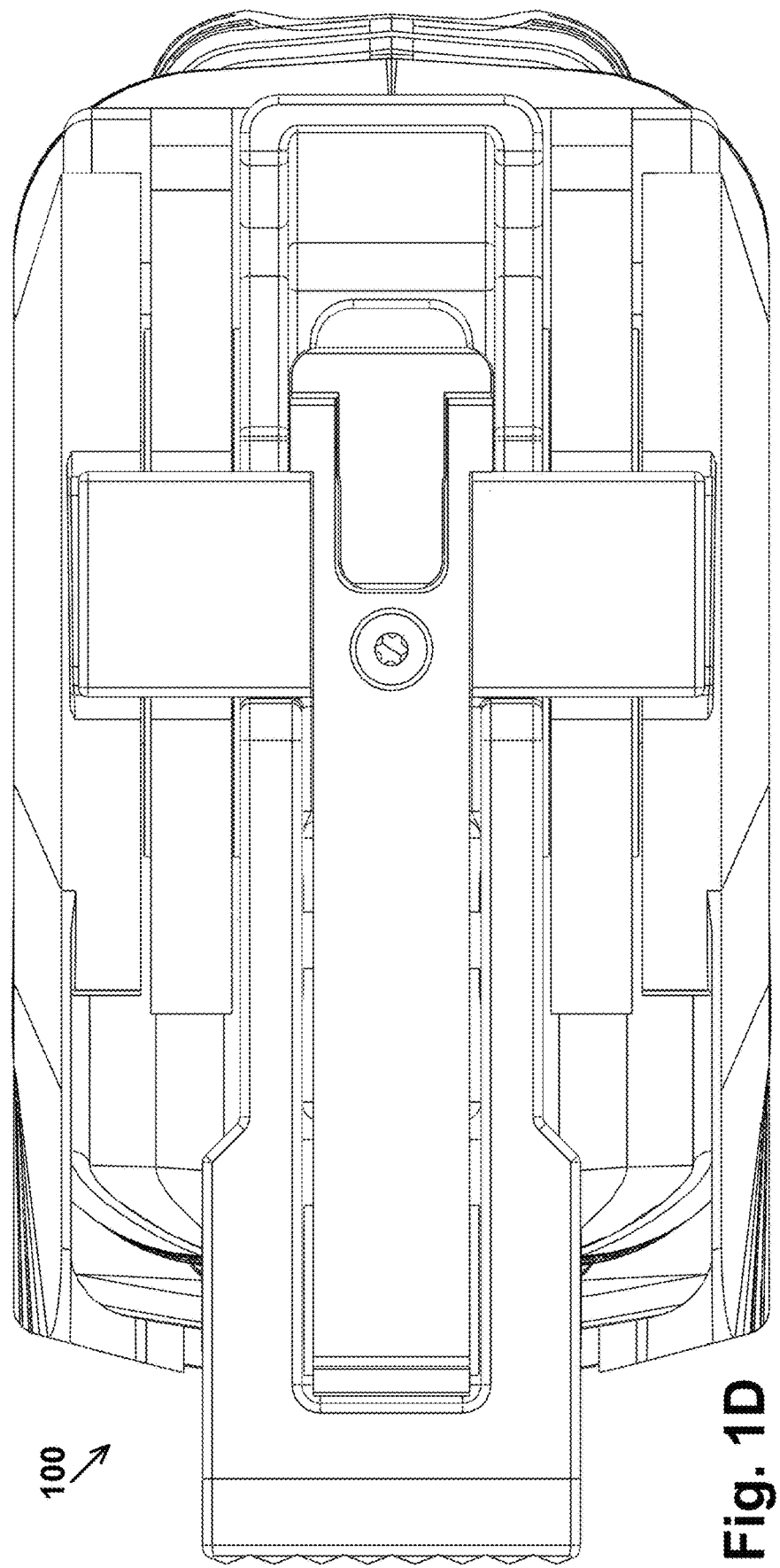
FIG. 1D is a top-view illustration of a top-portion of the multi-purpose apparatus, in accordance with some demonstrative embodiments of the present invention.

Reference is made to FIG. 1D, which is a top-view illustration of a top-portion of the multi-purpose apparatus 100, in accordance with some demonstrative embodiments of the present invention.

Figure 2:
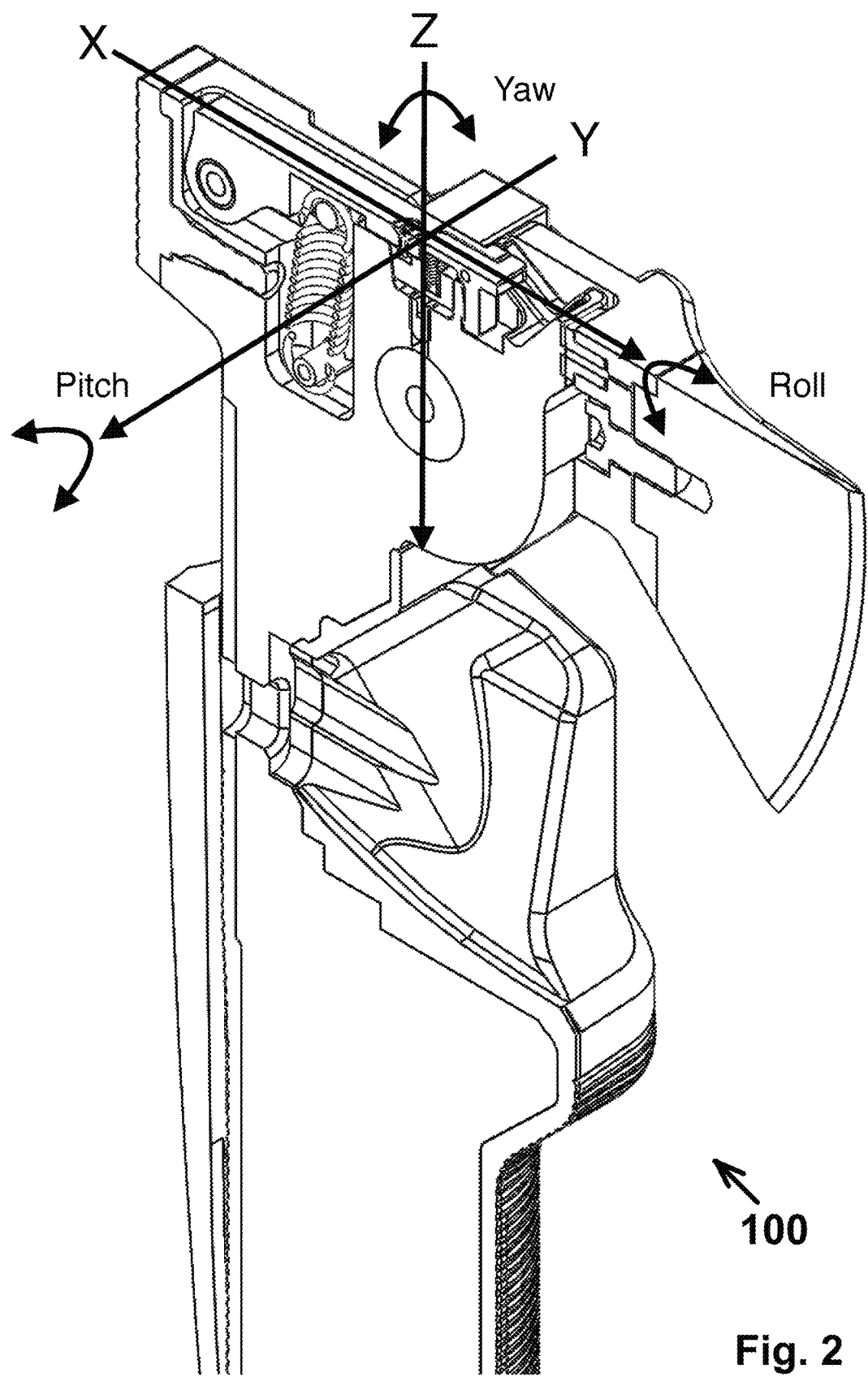
FIG. 2 is a cross-sectional perspective illustration of a top-portion of the multi-purpose apparatus, in accordance with some demonstrative embodiments of the present invention.

Reference is made to FIG. 2, which is a cross-sectional perspective illustration of a top-portion of the multi-purpose apparatus 100, in accordance with some demonstrative embodiments of the present invention. It demonstrates the ability of the locking mechanism to move along multiple axis lines or multiple degrees of freedom (e.g., yaw, pitch, roll), thereby enabling to fixedly lock in place the two or more tools of the apparatus, or conversely, to release one or more of the tools to move along a particular movement route or travel route or plane.

Figure 3A:
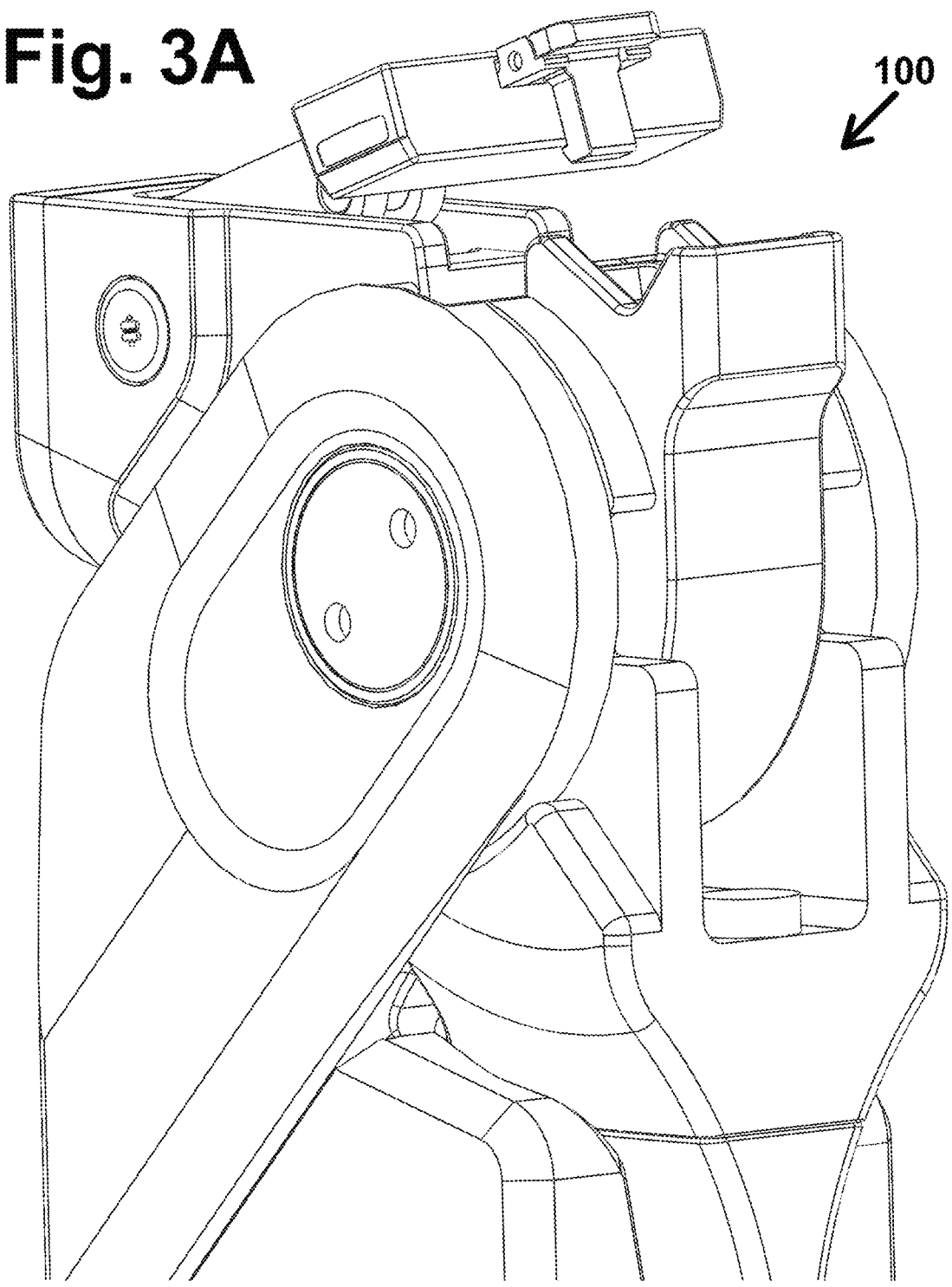
FIGS. 3A-3C are perspective illustrations of a top-portion of the multi-purpose apparatus, demonstrating the locking mechanism at three different operational positions, in accordance with some demonstrative embodiments of the present invention.
Figure 3B:
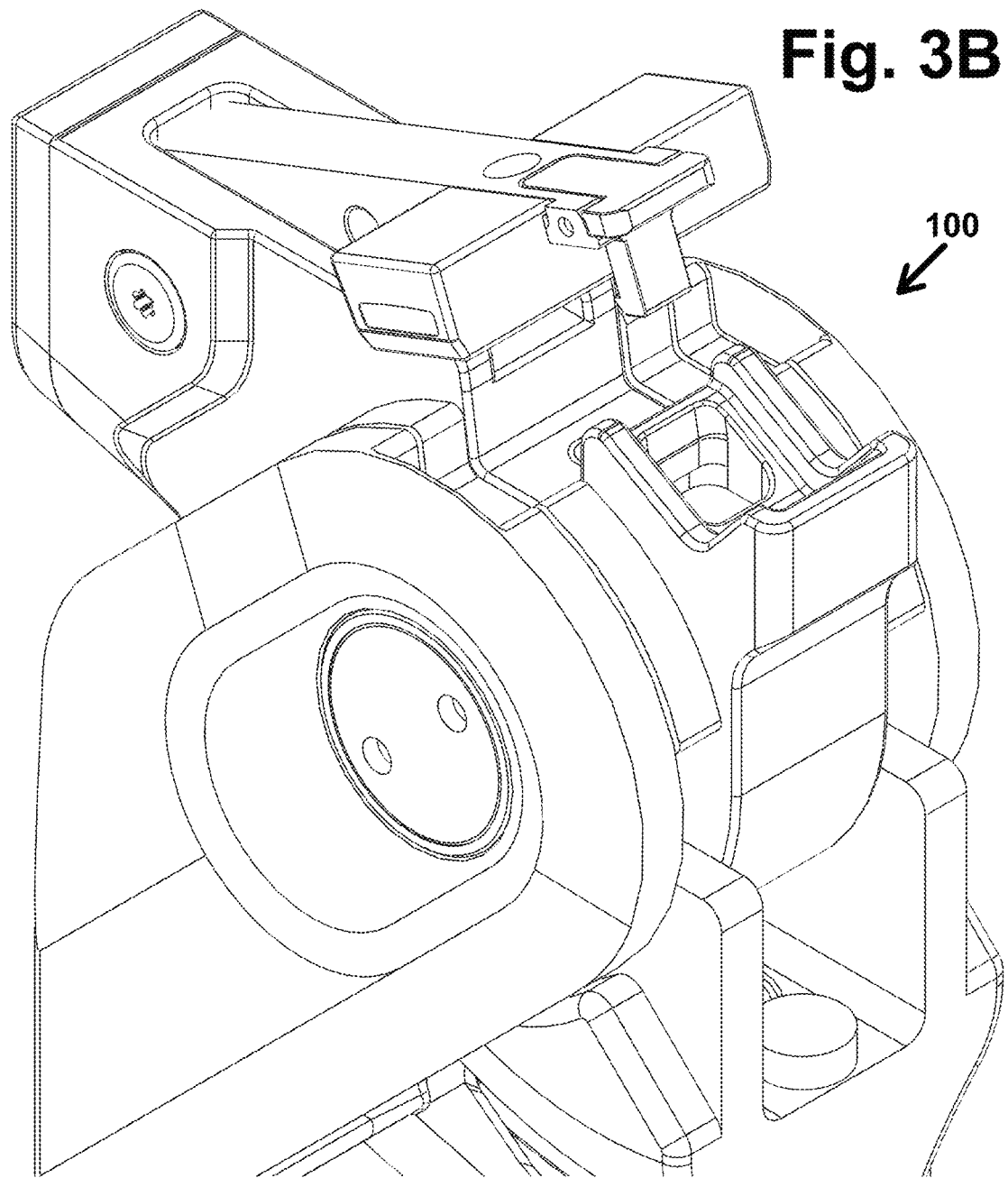
Figure 3C:
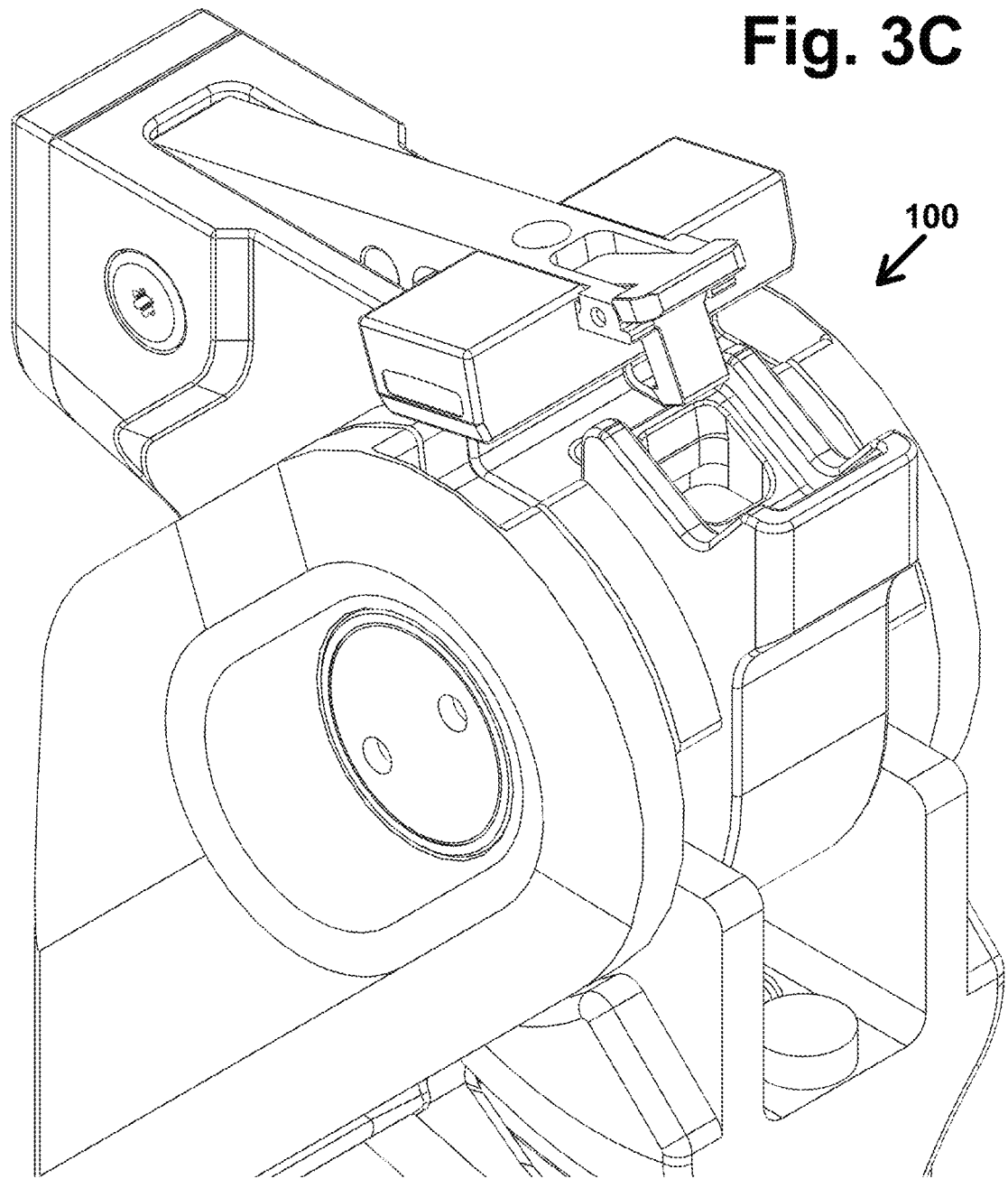

Reference is made to FIGS. 3A-3C, which are perspective illustrations of a top-portion of the multi-purpose apparatus 100, demonstrating the locking mechanism at three different operational positions, in accordance with some demonstrative embodiments of the present invention.

Figure 4A:
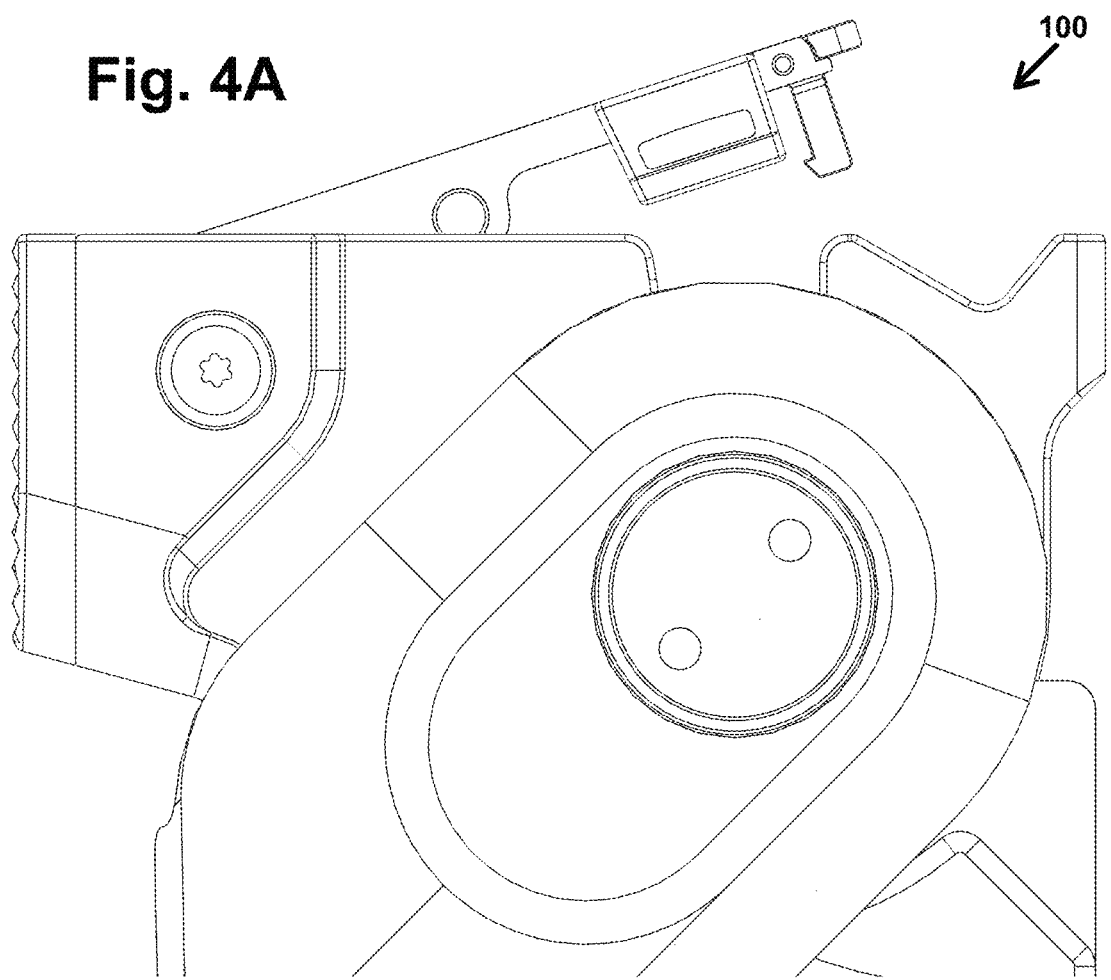
FIG. 4A is a side-view illustration of a top-portion of the multi-purpose apparatus, demonstrating the locking mechanism at a first of the multiple operational positions, in accordance with some demonstrative embodiments of the present invention.

Reference is made to FIG. 4A, which is a side-view illustration of a top-portion of the multi-purpose apparatus 100, demonstrating the locking mechanism at a first of the multiple operational positions, in accordance with some demonstrative embodiments of the present invention.

Figure 4B:
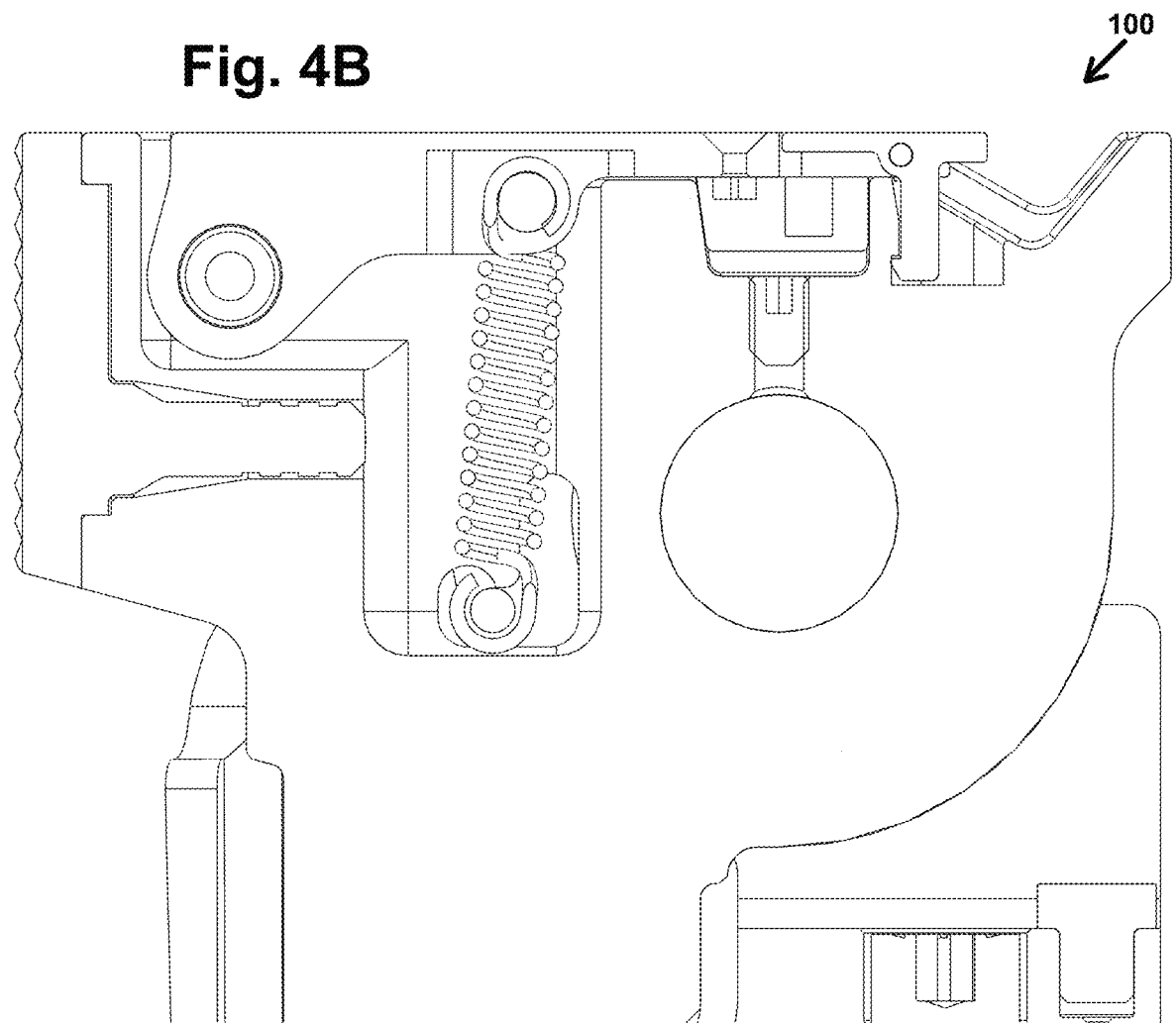
FIG. 4B is a cross-section side-view illustration of a top-portion of the multi-purpose apparatus, demonstrating the locking mechanism at a second of the multiple operational positions, in accordance with some demonstrative embodiments of the present invention.

Reference is made to FIG. 4B, which is a cross-section side-view illustration of a top-portion of the multi-purpose apparatus 100, demonstrating the locking mechanism at a second of the multiple operational positions, in accordance with some demonstrative embodiments of the present invention.

Figure 5A:
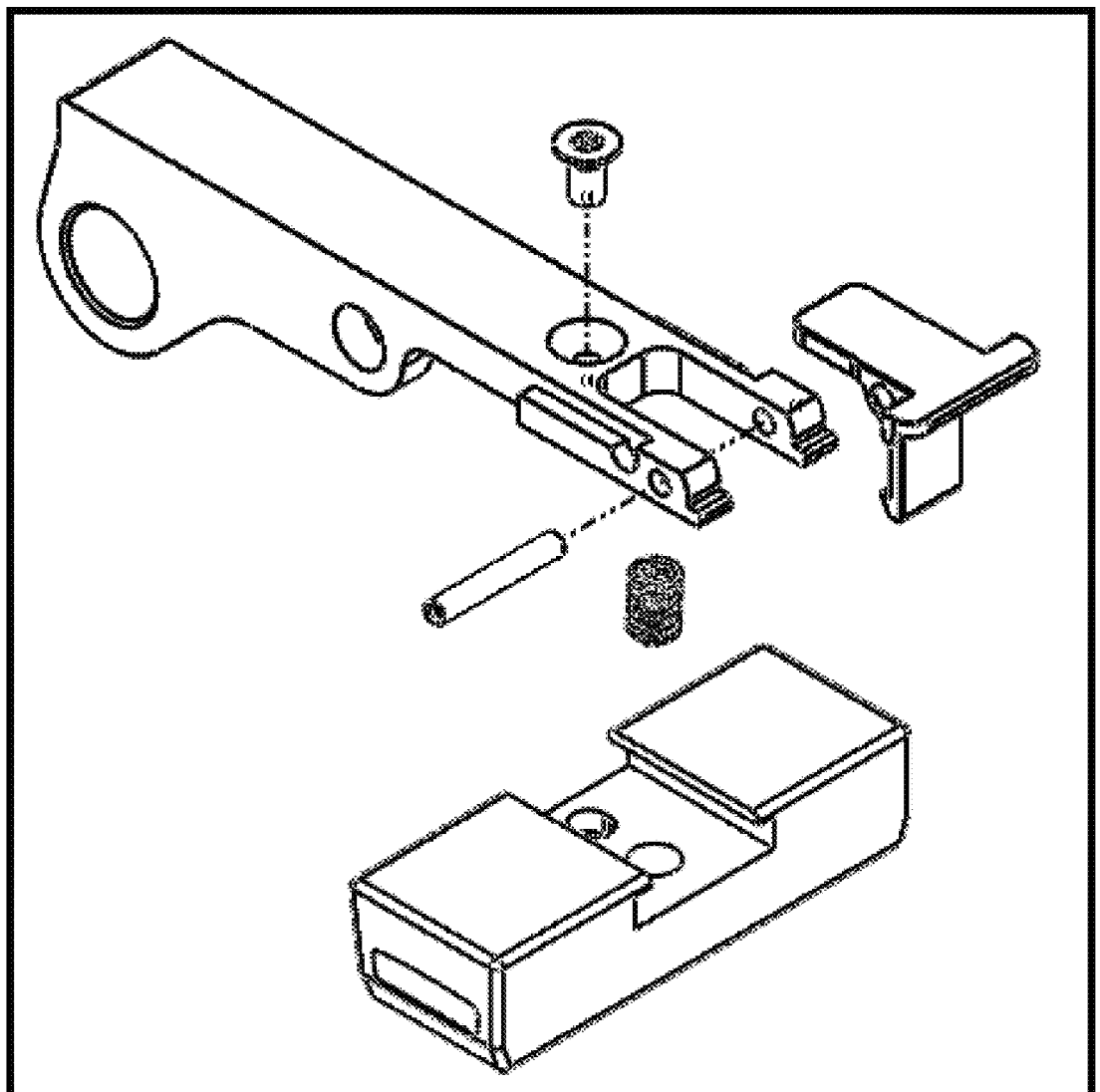
FIGS. 5A and 5B are perspective illustrations of exploded and disassembled views of a kit of components that, when assembled together, provide the locking mechanism in accordance with some demonstrative embodiments of the present invention.
Figure 5B:
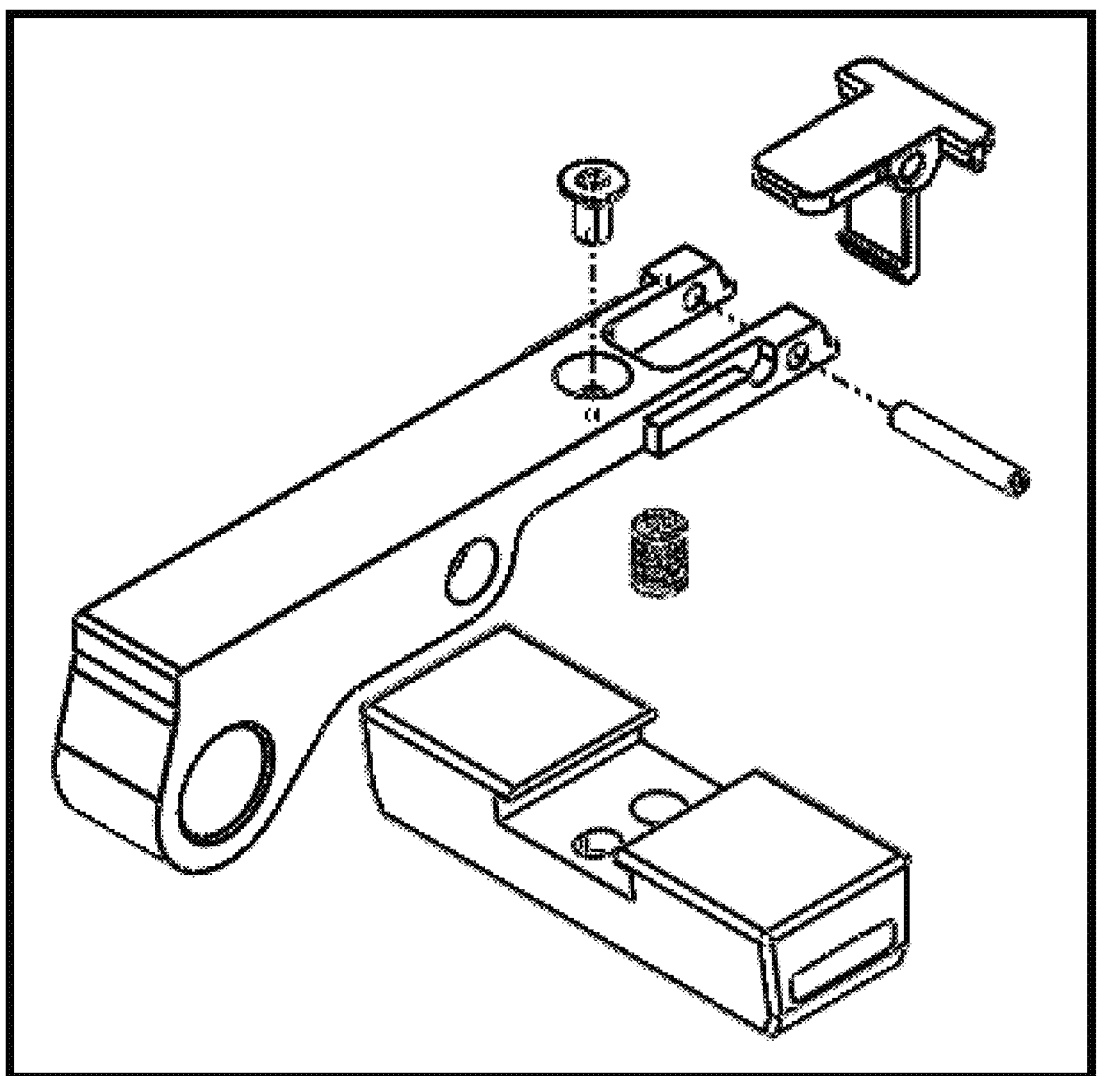

Reference is made to FIGS. 5A and 5B, which are perspective illustrations of exploded and disassembled views of a kit 120 of components that, when assembled together, provide the locking mechanism in accordance with some demonstrative embodiments of the present invention. These drawings may further enable or assist a person of ordinary skill in the art (in combination with the other drawings and/or with the textual description above and herein) to produce the locking mechanism of the present invention.

Figure 6A:
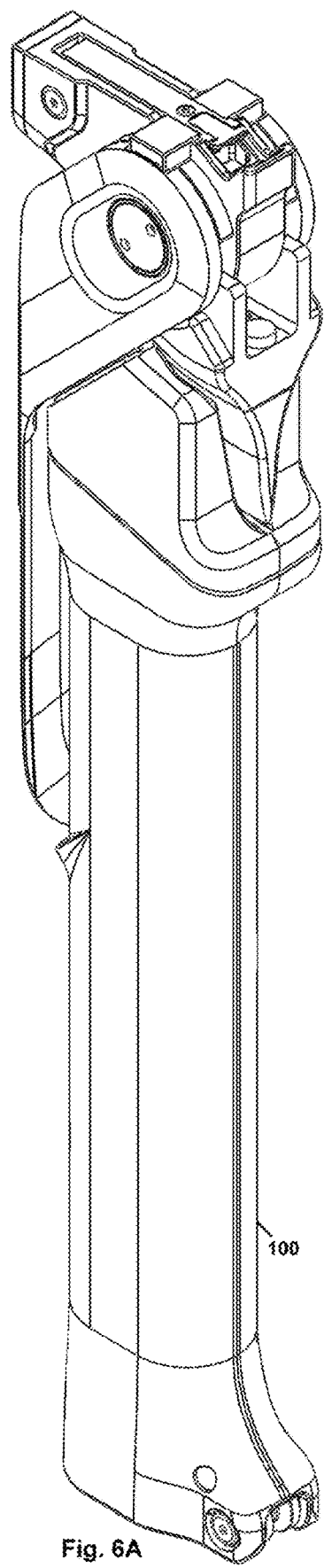
FIGS. 6A to 6E are perspective illustrations of the multi-purpose apparatus, demonstrating the locking mechanism and the tools at various operational positions, in accordance with some demonstrative embodiments of the present invention.
Figure 6B:
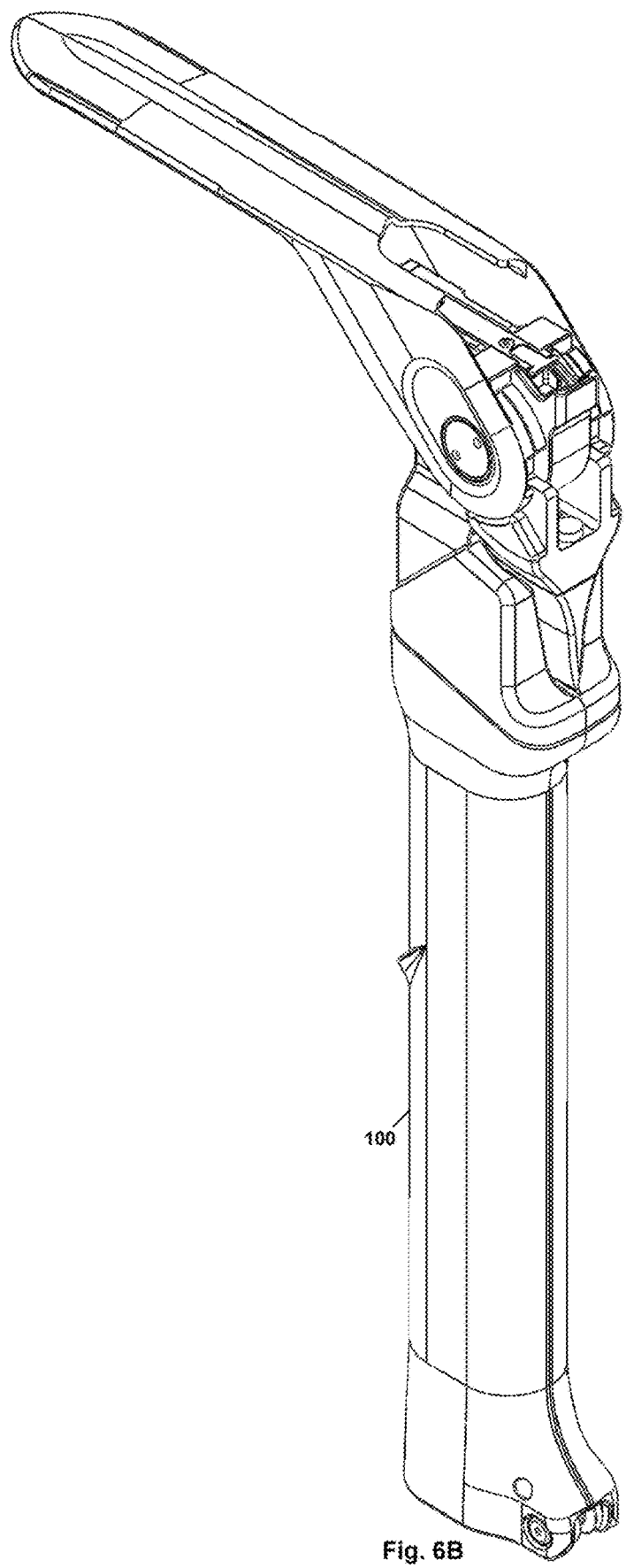
Figure 6C:
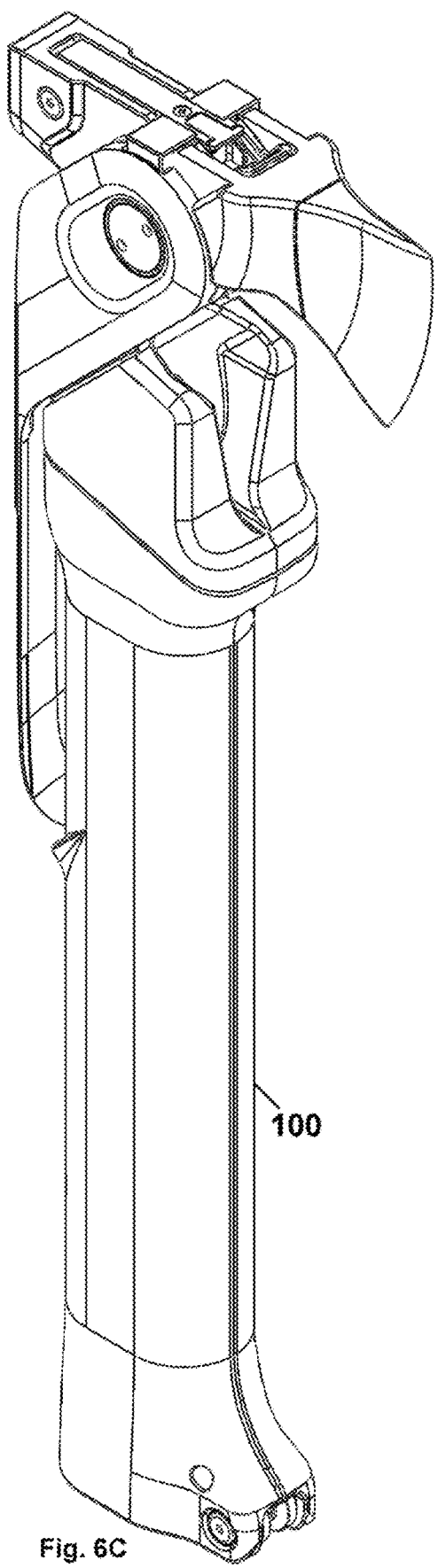
Figure 6D:
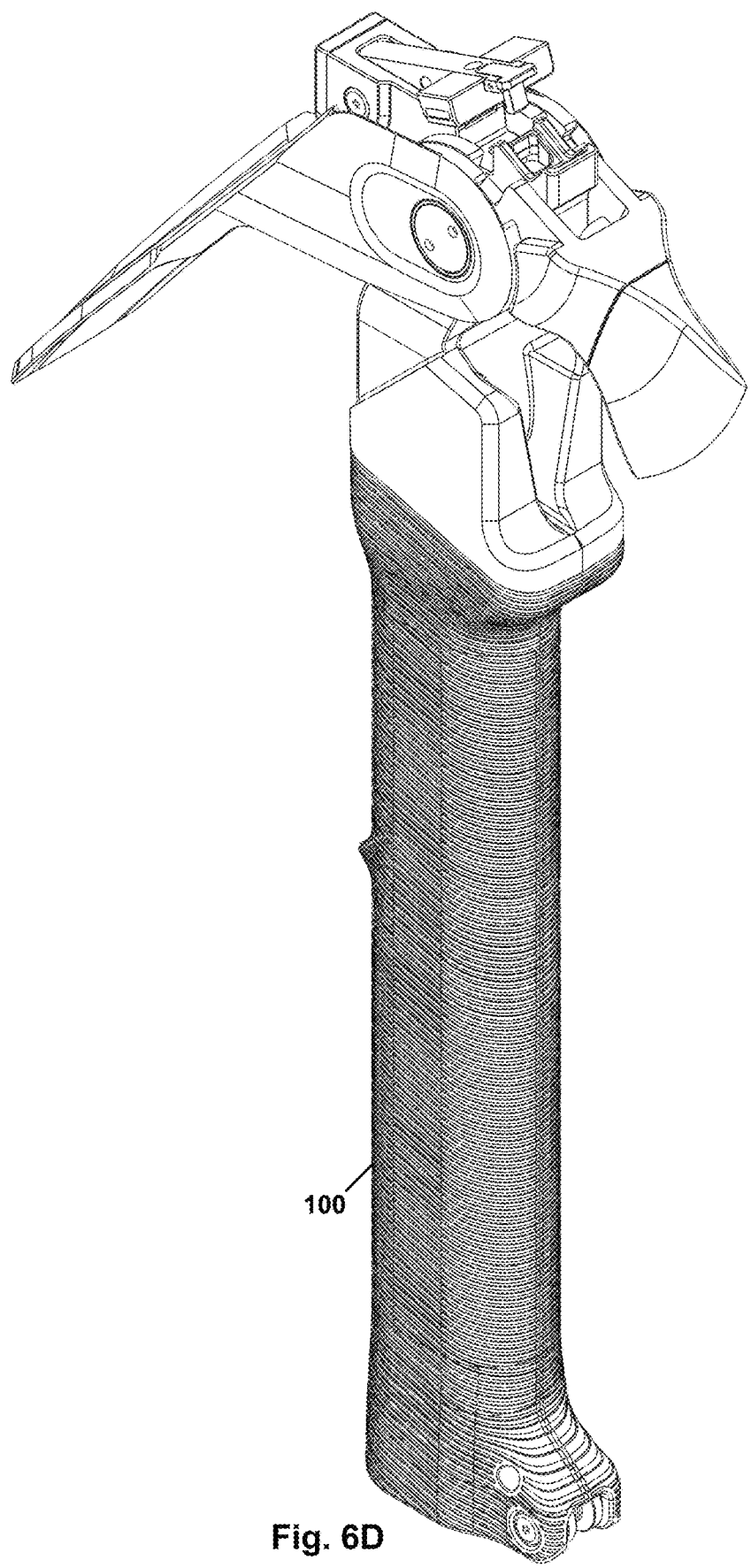
Figure 6E:
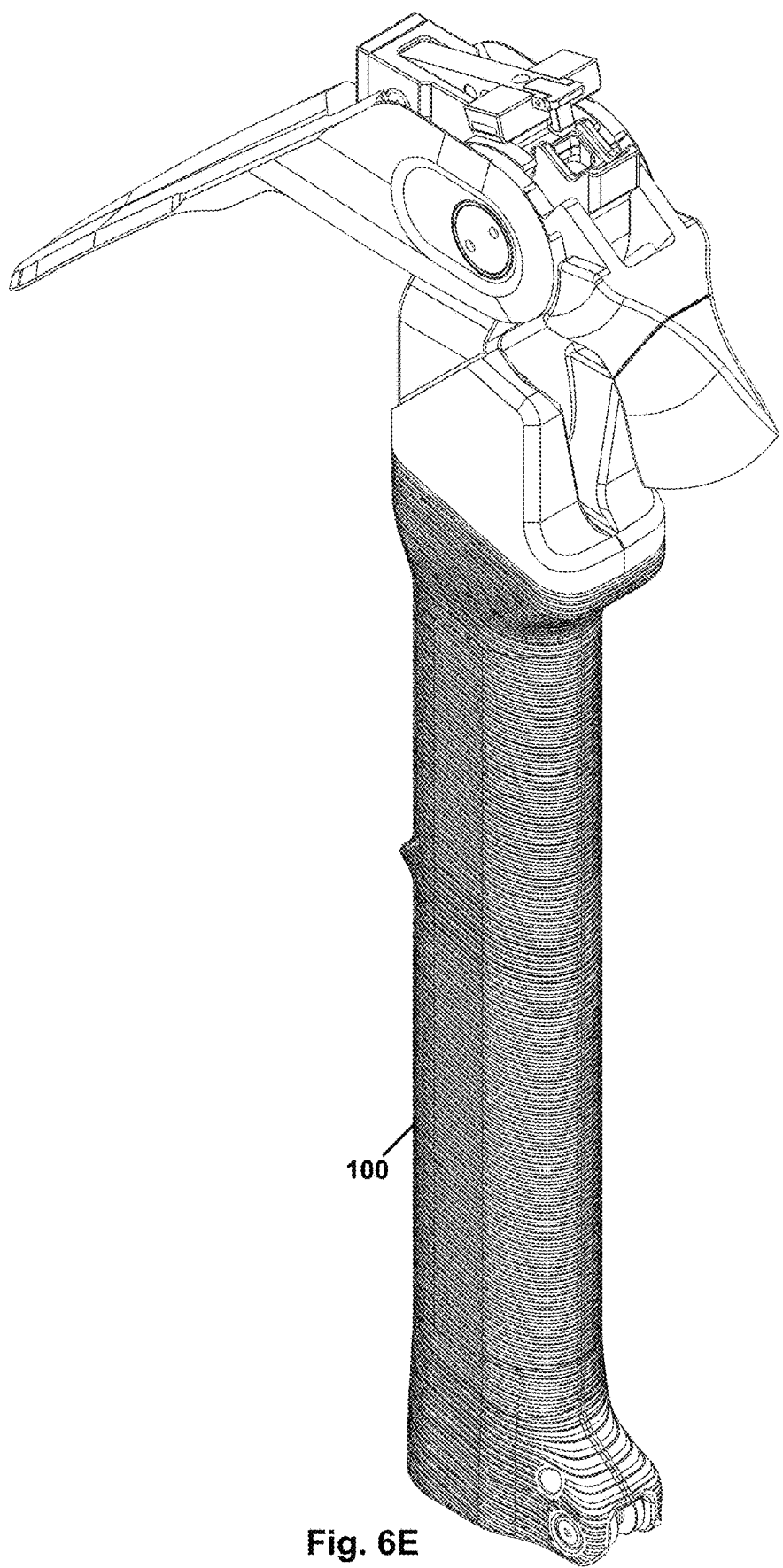
Figure 7C:
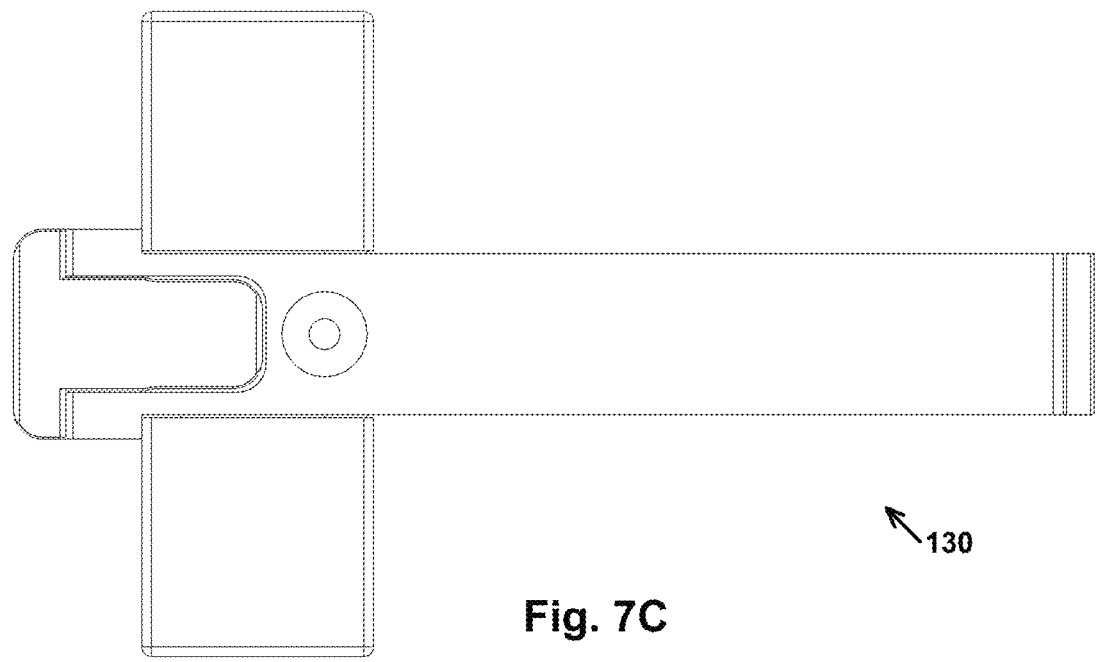
Figure 7D:
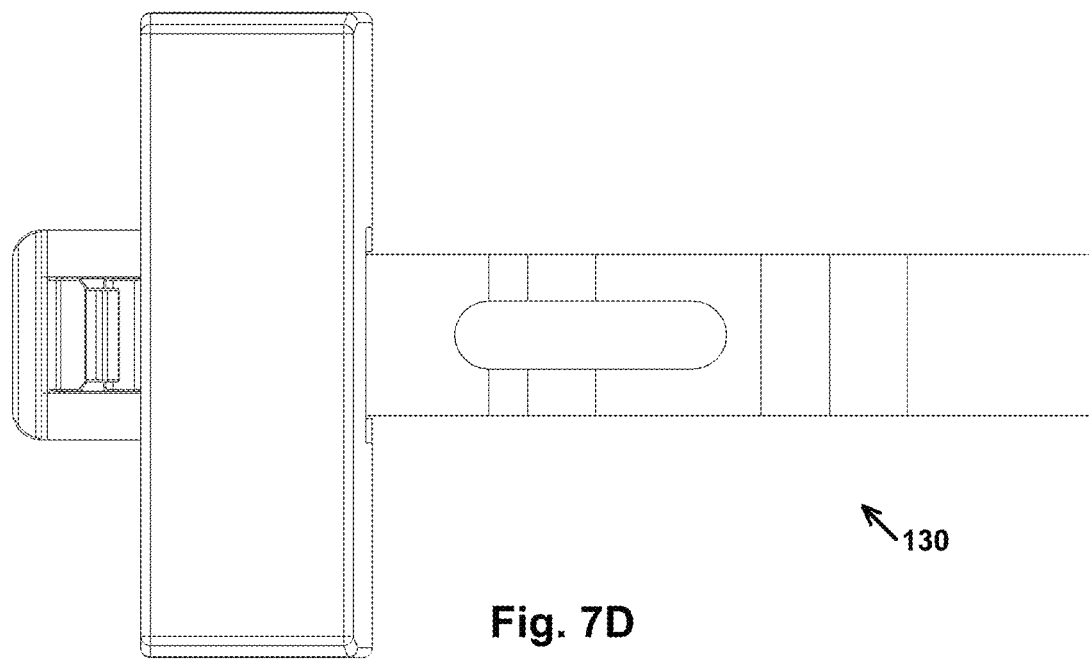

Reference is made to FIGS. 6A to 6E, which are perspective illustrations of the multi-purpose apparatus 100, demonstrating the locking mechanism and the tools at various operational positions, in accordance with some demonstrative embodiments of the present invention. In FIG. 6A, the shovel is in closed position, and the axe is in closed position. In FIG. 6B, the shovel is in open position (perpendicular to the handle of the apparatus), and the axe is in closed position. In FIG. 6C, the shovel is in closed position, and the axe is in open position. FIGS. 6D and 6E further demonstrate the movement or the relative movement of the locking mechanism, together with the axe and the shovel, as these tools between being operational (open) or non-operational (closed).

Reference is made to FIGS. 7A to 7F, which are side-view illustrations of a locking mechanism 130 of a multi-purpose apparatus, in accordance with some demonstrative embodiments of the present invention.

Figure 8A:
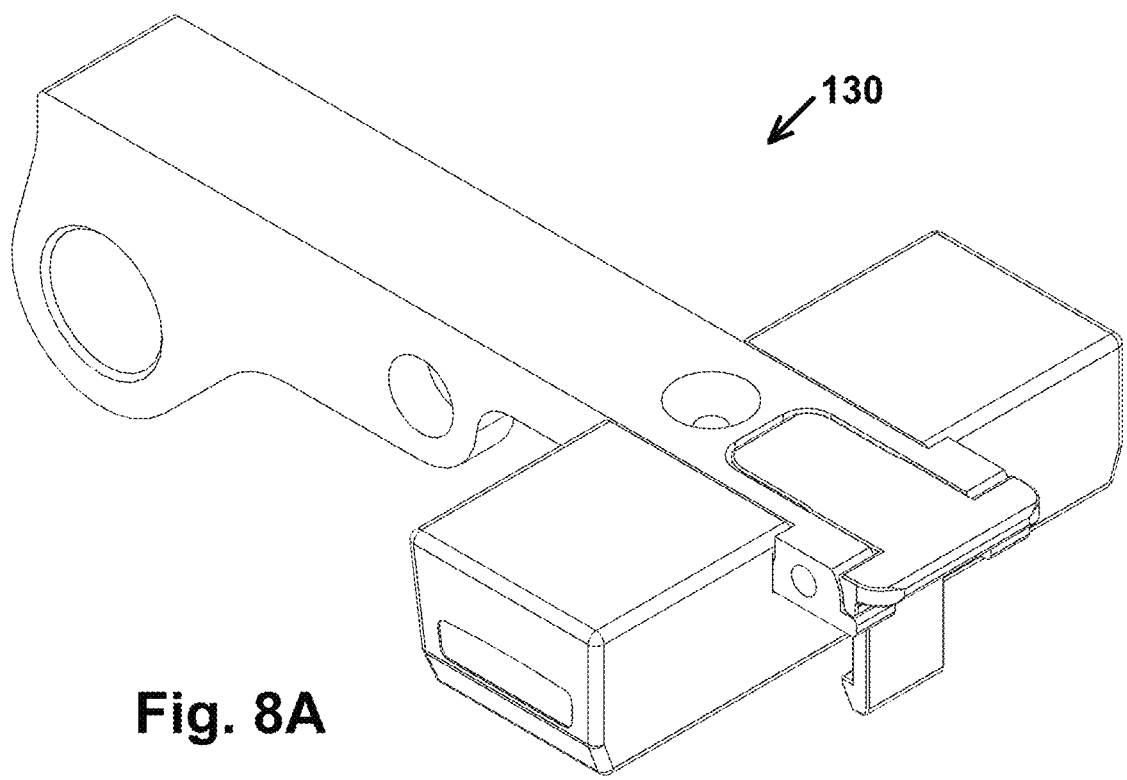
FIGS. 8A to 8C are perspective illustrations of the locking mechanism of the multi-purpose apparatus, in accordance with some demonstrative embodiments of the present invention.
Figure 8B:
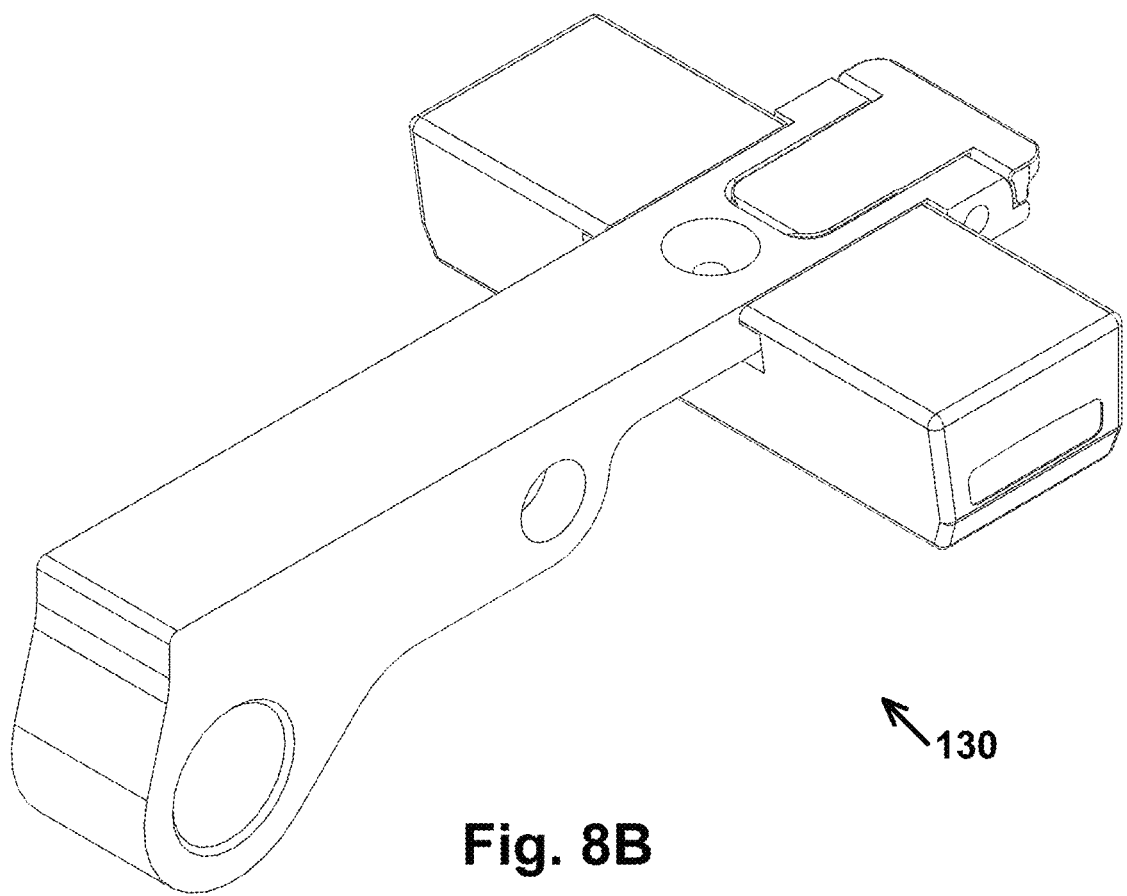
Figure 8C:
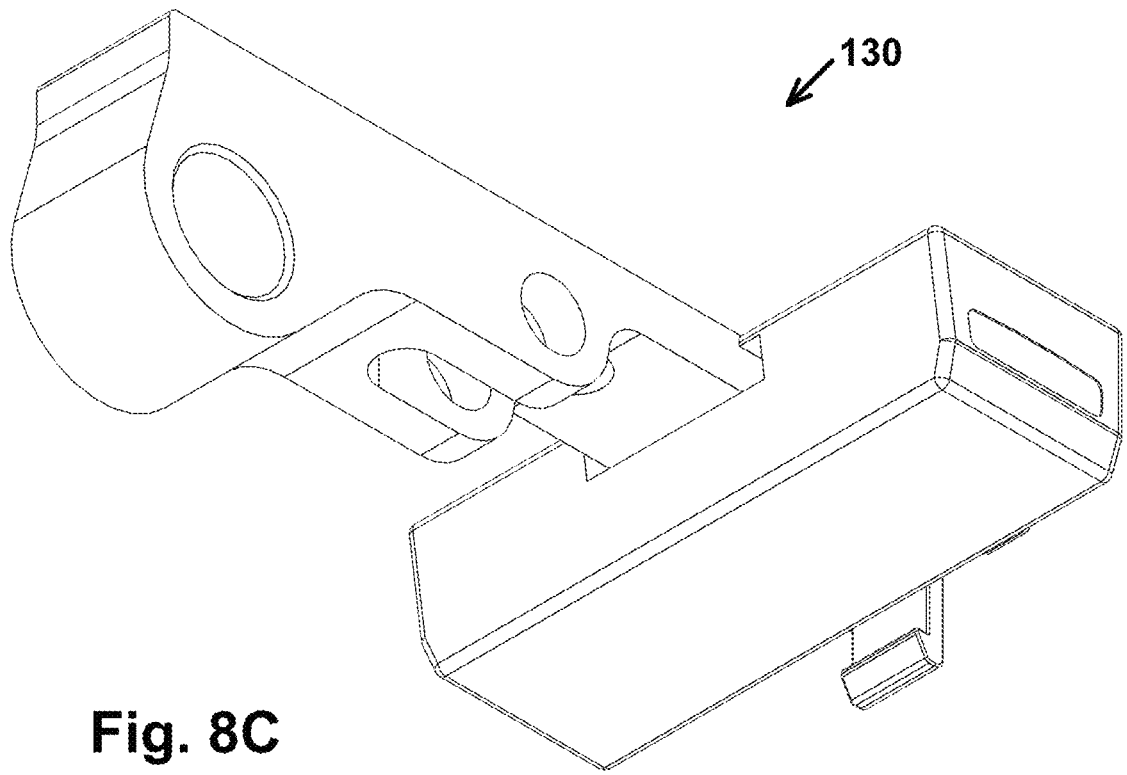

Reference is made to FIGS. 8A to 8C, which are perspective illustrations of the locking mechanism 130 of a multi-purpose apparatus, in accordance with some demonstrative embodiments of the present invention.

Figure 9A:
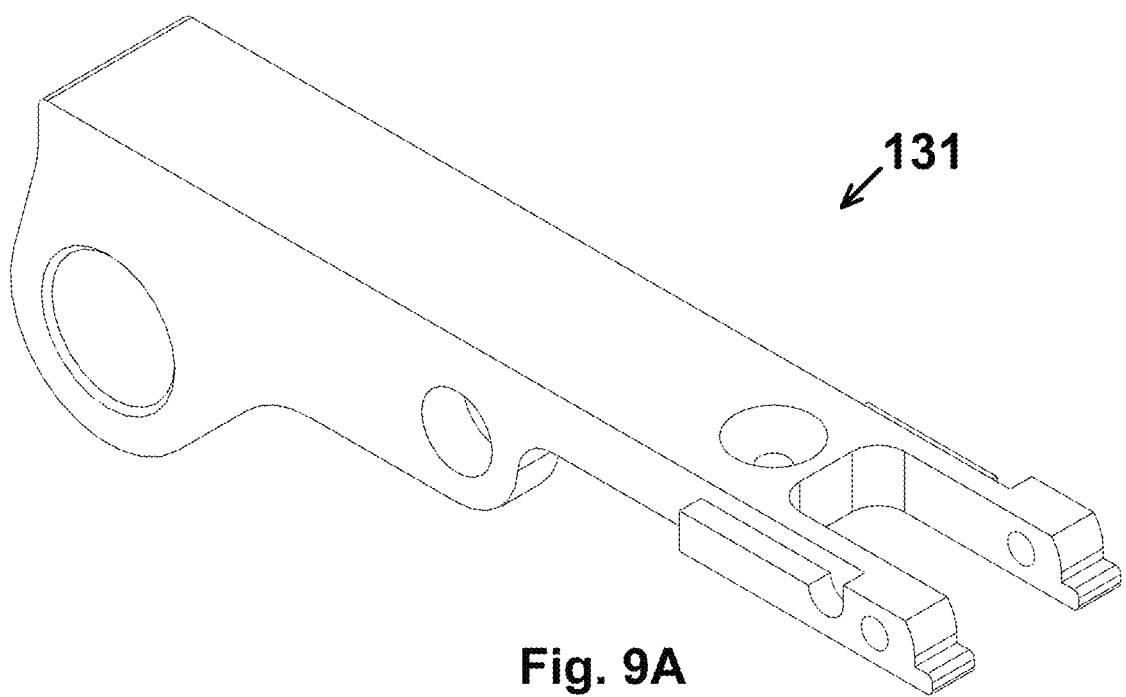
FIGS. 9A-9C are perspective illustrations of three main components of the locking mechanism of a multi-purpose apparatus, in accordance with some demonstrative embodiments of the present invention.
Figure 9B:
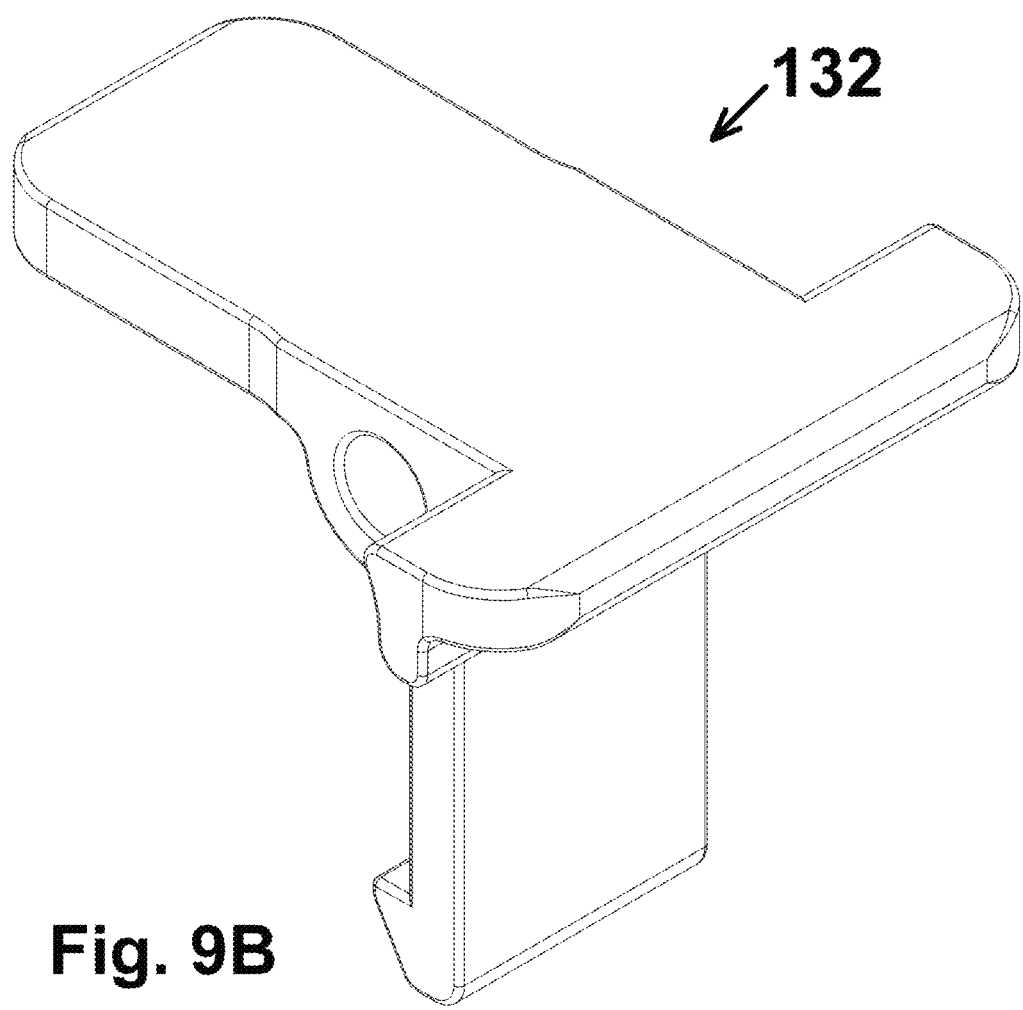
Figure 9C:
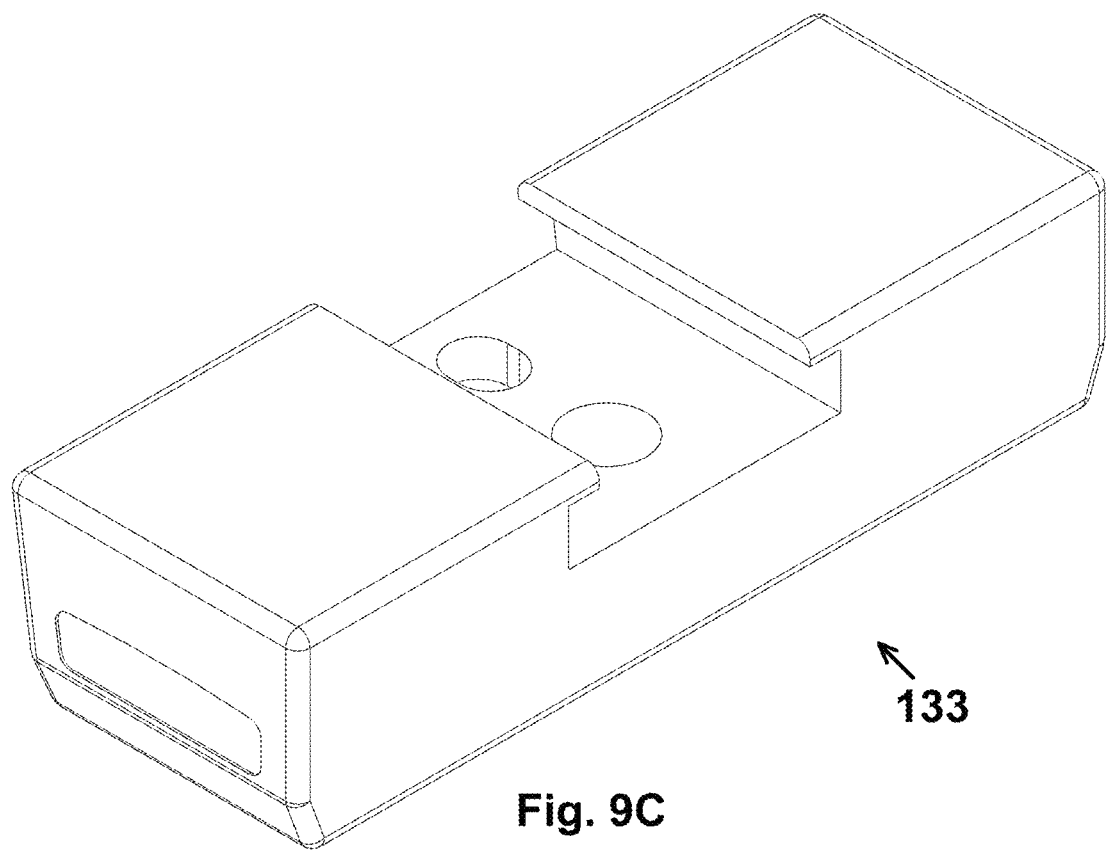

Reference is made to FIGS. 9A-9C, which are perspective illustrations of three main components 131-133 (respectively) of the locking mechanism 130 of a multi-purpose apparatus, in accordance with some demonstrative embodiments of the present invention.

In some embodiments, the mechanism comprises three main elements: Lock, Latch and Lever; which may be utilized in cooperation with each other and/or in cooperation with other components of the multi-purpose apparatus. The three main elements are operable or are interconnected to each other via additional or assisting elements, such as: Lever Spring, Lever Axle, Latch Spring, and Latch Axle.

The Lock is a rigid wedge element that forms a continuous bridge between or within or relative to a similar female wedge shape or female shaped cavity or recess that in the Main Body of the multi-purpose apparatus and/or in one or more of the tool(s). The lock transfers forces from the Main Body to the tools, and back in reverse direction, as part of their normal usage.

The Latch is a safety element that prevents the Lever from moving from the Locked position; such as, in order to prevent accidental release or movement of the lever, due to an inadvertent motion of the user and/or of the apparatus, or due to a vertical fall of the apparatus. The Latch mates its locking tooth or its bottom-side tooth (or pin, or protrusion, or male element) to or into or around a small step or pin or protrusion located at the Main Body. The locking force of the Latch is generated by the Latch Spring. Releasing its lock is achieved by a force applied by the user. The Latch is constrained at it mates to the Lever in a way that will allow the Lever to move on to the Locked and Safe position without interference.

The Lever is an element for connecting and force transferring, that holds both the Lock and the Latch The Lever forces the Lock into its locking position, by transferring a locking force, generated by the Lever Spring. The Latch is a part of the Lever's end. They are joined by the Latch Axle. The Lever is joined to the Main Body by the Lever Axle.

A main component of the mechanism is the Lock. Its purpose is to unify (or lock) the optional tools (one or more) to the main tool body (Main Body). The locked tool (or tools) may be at a combination of positions; for at least some of the tools (e.g., axe, spade) each tool has at least two positions: (i) a Functional position or functioning position or operational position or open position, and (ii) a Tucked Away position or closed position or stored position or non-operational position.

The Lock has two (or at least two) positions: (I) "Locked and Safe", or (II) "Unlocked". Optionally, in some embodiments, the lock may be, temporarily, in a locked and non-safe position.

In the Locked and Safe position, each one of the tools is at either the Tucked Away position or at one of the Functional positions, and the Lock unifies them or causes them to be fixedly non-movable relative to each other and/or relative to the Main Body and/or relative to the elongated handle of the apparatus. At this position, the Latch locks itself in a way that prevents the lock from leaving the Locked position or from being inadvertently or accidentally released therefrom. The lock is continuously forced in the Z axis by the Lever, in order to maintain a lock between Tool/s and Main Body. In some embodiments, the mate between Lock and Lever, at the "Locked and Safe position", is a mate only in the Z direction or in the vertical direction; whereas other directions or other degrees of freedom (X, Y, Yaw, Pitch, Roll) are not constrained by the Lever, in order to allow the Lock to set itself as best as possible, relative to the Main Body and Tool/s.

The "Locked and Safe position" is a "Stable" position: it will continue to be fixedly maintained until an active action by the user will force it out of that position. A normal use of the apparatus (e.g., by operating one of the tools or some of the tools, such as, by using the axe, and/or by using the hammer had, and/or by using the spade or shovel, or the like) will not unlock the tool and will not cause a release (intentional or unintentional) from the "Locked and Safe position".

The Latch is also "Stable" and fixed while in the Locked and Safe position; and it will continue to stay Safe until the user forces it open.

In the user unlocking processor, a user attempting to unlock the tool(s) of the apparatus may apply a force on the Latch. The first element to give and to be released is the Latch, as the user overcomes the Latch Spring forces and rotates the Latch about the Latch Axle, from a safe or latched position, to an unsafe or released or non-latched position. A vector of that force may further generate (or may translate to) a force on the Lever in the upward Z direction. Once the Latch tooth cleared the step or pin that held the Latch tooth in place, and the upward force has overcome the Lever spring, the Lever will move up and will engage upward forces on the Lock. A strong enough force or a sufficiently-strong force will cause the Lock to release from its locked position.

In the Unlocked position, the Lock is away from the Main Body and from the tool/s, thus allowing the tool/s to move (e.g., freely, or free to a particular extent or within certain spatial constraints) between or among positions. The Lock at the Unlocked position is spaced at a minimum distance from both the Main Body and the Tool/s, to allow for the free movement. The mate between the Lock and the Lever is structured or configured in a way that will transfer an upward extracting force from the Lever to the Lock and keep holding the Lock while it is in the Unlocked position so that the Lock would be ready to subsequently be re-inserted to a new Locked position.

The Unlocked position is an "Unstable" position; for example, keeping or maintaining it may require the user to maintain an active opening force on the Lever. Stopping the application of that opening force will let the lock move back to the stable "Locked and Safe position", pending the tools are rightly oriented in any of the possible positions, to allow a lock. In some embodiments, once the Lock and Lever reach the Locked position, the Latch will slip itself into the Safe position, without any required user force.

For demonstrative purposes, the locking and safety mechanism of the present invention is demonstrated in the context of, or as being part of, a multiple-tool apparatus or a multi-tool apparatus which has two or more tools and such that the mechanism is able to lock and/or secure and/or hold in place two or more tools of such apparatus; however, in accordance with the present invention, the same mechanism or a generally similar mechanism may be utilized in conjunction with (or may be part of) other suitable devices or articles or equipment items; particularly, as part of a single-tool apparatus or device, or a single-function apparatus or device or tool, which has one single tool or feature; and particularly with a single-tool apparatus having a single tool which is able to move or rotate or spin or fold or collapse or expand or shrink, from (i) being in an open position or an operational position or a functional position or an expanded position or an unfolded position, to (ii) being in a closed position or a tucked-away or tucked-in position or a folded position or a collapsed position; or, with a single-tool apparatus having a single tool which is able to move or rotate or spin or fold or collapse or expand or shrink, among three or more positions or modes, such as, (I) a first mode or position or arrangement in which the tool is in an open position or an operational position or a functional position or an expanded position or an unfolded position, and (II) a second mode or position or arrangement in which the tool is in an operational position (e.g., a spade or shovel that is perpendicular to the handle of the apparatus), and (III) a third mode or position or arrangement in which the tool is in another operational position (e.g., the spade or shovel is generally parallel to the handle of the apparatus); and accordingly, the mechanism of the present invention may similarly lock and secure in place such single tool, at one of its two possible modes or positions, or at one of its three (or more) possible modes or positions.

For demonstrative purposes, the locking and safety mechanism of the present invention is demonstrated in the context of, or as being part of, a multiple-tool apparatus or a multi-tool apparatus; however, in accordance with the present invention, the same mechanism or a generally similar mechanism may be utilized in conjunction with (or may be part of) other suitable devices or articles or equipment items; particularly as part of a device that has two or more tools or features, or two or more functions or operational properties, or two or more operational positions or operational modes, or two or more spatial arrangements, or having folded and un-folded positions or modes, or having an expanded and shrunken positions or modes, or having collapsed or non-collapsed positions or modes, or having exposed and tucked-away (or tucked-in) positions or modes; or as part of a device that can be folded and unfolded, or that can be collapsed and non-collapsed, or that can have one or more features operational while one or more other device features are non-operational, or the like. The locking and safety mechanism of the present invention may be part of, for example: a folding backpack or carrying bag or carrying case; a folding tent; a folding or collapsible cart; a folding or collapsible wheelchair; a folding or collapsible assistive device for persons with disabilities or with special needs; a folding or collapsible assistive device for children or for senior citizens; a folding or collapsible device for hikers or farmers or carpenters or construction workers or builders or plumbers or electricians or persons having other occupations; a device that can be re-assembled or re-configured or switched between two positions (e.g., an open position, and a close position); a device having at least one feature or one component that can be switched between three (or more) modes or positions (e.g., tucked-away position, semi-open first operational position, and fully-open second operational position; similar to the shovel tool or spade tool of the multi-purpose apparatus); and/or other suitable devices. The locking and safety mechanism of the present invention may be incorporated into or onto such device(s), in a manner that enables the locking and safety mechanism to fixedly lock into place one or more components or elements or tools or features of the device, and to be safely latched at such locked position; and to later be released from the latched position and released from the locked position as well.

The present invention may provide a locking mechanism for a multi-purpose apparatus; wherein the apparatus comprises at least a first tool and a second tool; wherein the first tool is mechanically rotatable from being at first position to being in a second position; wherein the second tool is mechanically rotatable from being at first position to being in a second position. The locking mechanism comprises: a rotatable elongated lever (112) that is connected perpendicularly to a locking bar (111); wherein said locking mechanism is switchable among at least three different operational positions which comprise at least: (i) a first position in which said locking mechanism locks in place both the first tool and the second tool when the first tool and the second tool are in closed positions; and (ii) a second position in which said locking mechanism locks in place both the first tool and the second tool when the first tool is in open position and the second tool is in closed position; and (iii) a third position in which said locking mechanism locks in place both the first tool and the second tool when the first tool is in closed position and the second tool is in open position.

In some embodiments, the locking mechanism is switchable among at least four different operational positions which comprise at least: (i) a first position in which said locking mechanism locks in place both the first tool and the second tool when the first tool and the second tool are in closed positions; and (ii) a second position in which said locking mechanism locks in place both the first tool and the second tool when the first tool is in open position and the second tool is in closed position; and (iii) a third position in which said locking mechanism locks in place both the first tool and the second tool when the first tool is in closed position and the second tool is in a first open position of 90 degrees relative to a handle of said multi-purpose apparatus; and (iv) a fourth position in which said locking mechanism locks in place both the first tool and the second tool when the first tool is in closed position and the second tool is in a first open position of 180 degrees relative to the handle of said multi-purpose apparatus;

In some embodiments, the first tool is a folding axe; the second tool is a folding shovel; the locking mechanism is switchable among at least three different operational positions which comprise at least: (i) a first position in which said locking mechanism locks in place both the axe and the shovel when the axe and the shovel are in closed positions; and (ii) a second position in which said locking mechanism locks in place both the axe and the shovel when the axe is in open position and the shovel is in closed position; and (iii) a third position in which said locking mechanism locks in place both the axe and the shovel when the axe is in closed position and the shovel is in open position.

In some embodiments, the first tool is a folding axe; the second tool is a folding shovel; said locking mechanism is switchable among at least four different operational positions which comprise at least: (i) a first position in which said locking mechanism locks in place both the axe and the shovel when the axe and the shovel are in closed positions; and (ii) a second position in which said locking mechanism locks in place both the axe and the shovel when the axe is in open position and the shovel is in closed position; and (iii) a third position in which said locking mechanism locks in place both the axe and the shovel when the axe is in closed position and the shovel is in a first open position of 90 degrees relative to a handle of said multi-purpose apparatus; and (iv) a fourth position in which said locking mechanism locks in place both the axe and the shovel when the axe is in closed position and the shovel is in a second open position of 180 degrees relative to a handle of said multi-purpose apparatus.

In some embodiments, the locking mechanism further comprises: a rotatable latch element (113), mounted on top of said rotatable elongated lever (112), and reaching downwardly around and under said locking bar (111). The rotatable latch element (113) is switchable between at least two latch positions that comprise: (I) a first, secured, latch position which fixedly secures the rotatable elongated lever (112) and prevents the rotatable elongated lever (112) from rotating; and (II) a second, released, latch position which allows the rotatable elongated lever (112) to rotate.

In some embodiments, the rotatable latch element (113) and the rotatable elongated lever (112) share a same plane of rotation. In some embodiments, the rotatable latch element (113) is capable of rotating along said plane of rotation regardless of whether the rotatable elongated lever (112) is secured or unsecured. In some embodiments, the rotatable elongated lever (111) is capable of rotating along said plane of rotation only when said rotatable latch element (112) is in a released latch position.

In some embodiments, both the rotatable latch element (113) and the rotatable elongated lever (112) are able to rotate along a first, same, plane of rotation; wherein only the rotatable latch element (113), and not the rotatable elongated lever (112), is able to also rotate along a second plane of rotation that is generally perpendicular to said first plane of rotation.

In some embodiments, an anchor of rotation of the rotatable elongated lever (112) is adjacent to a hammer head tool of said multi-purpose apparatus.

In some embodiments, the locking bar (111) and the rotatable elongated lever (112) form together a T-shaped locking element.

In some embodiments, the locking bar (111) and the rotatable elongated lever (112) form together a T-shaped locking element; wherein the latch element (113) forms a T-shaped securing element.

In some embodiments, the locking bar (111) is capable of entering into, and exiting from, a cavity in a rotating element of the multi-purpose apparatus that rotates at least one of the first tool and the second tool. In some embodiments, the locking bar (111) autonomously slides into said cavity upon rotation of said rotation element of the multi-purpose apparatus, and causes locking of the first tool at an open position while also locking the second tool at a closed position.

In some embodiments, the locking bar (111) prevents the first tool and the second tool from concurrently being at open positions.

Some embodiments provide a multi-purpose apparatus or a multi-tool device, which comprises the locking mechanism as described. In some embodiments, the first tool is a folding axe, and the second tool is a folding shovel.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. A locking mechanism for a multi-purpose apparatus,
wherein the apparatus comprises at least a first tool and a second tool,
wherein the first tool is mechanically rotatable from being at a first position to being in a second position,
wherein the second tool is mechanically rotatable from being at a first position to being in a second position,
wherein the locking mechanism comprises: a rotatable elongated lever (112) that is connected perpendicularly to a locking bar (111);
wherein said locking mechanism is switchable among at least three different operational positions which comprise at least:
(i) a first position in which said locking mechanism locks in place both the first tool and the second tool when the first tool and the second tool are in closed positions; and
(ii) a second position in which said locking mechanism locks in place both the first tool and the second tool when the first tool is in open position and the second tool is in closed position; and
(iii) a third position in which said locking mechanism locks in place both the first tool and the second tool when the first tool is in closed position and the second tool is in open position.

2. The locking mechanism of claim 1,
wherein the locking mechanism is switchable among at least four different operational positions which comprise at least:
(i) a first position in which said locking mechanism locks in place both the first tool and the second tool when the first tool and the second tool are in closed positions; and
(ii) a second position in which said locking mechanism locks in place both the first tool and the second tool when the first tool is in open position and the second tool is in closed position; and
(iii) a third position in which said locking mechanism locks in place both the first tool and the second tool when the first tool is in closed position and the second tool is in a first open position of 90 degrees relative to a handle of said multi-purpose apparatus; and
(iv) a fourth position in which said locking mechanism locks in place both the first tool and the second tool when the first tool is in closed position and the second tool is in a first open position of 180 degrees relative to the handle of said multi-purpose apparatus.

3. The locking mechanism of claim 1,
wherein the first tool is a folding axe,
wherein the second tool is a folding shovel,
wherein the locking mechanism is switchable among at least three different operational positions which comprise at least:
(i) a first position in which said locking mechanism locks in place both the axe and the shovel when the axe and the shovel are in closed positions; and
(ii) a second position in which said locking mechanism locks in place both the axe and the shovel when the axe is in open position and the shovel is in closed position; and
(iii) a third position in which said locking mechanism locks in place both the axe and the shovel when the axe is in closed position and the shovel is in open position.

4. The locking mechanism of claim 1,
wherein the first tool is a folding axe,
wherein the second tool is a folding shovel,
wherein said locking mechanism is switchable among at least four different operational positions which comprise at least:
(i) a first position in which said locking mechanism locks in place both the axe and the shovel when the axe and the shovel are in closed positions; and
(ii) a second position in which said locking mechanism locks in place both the axe and the shovel when the axe is in open position and the shovel is in closed position; and (iii) a third position in which said locking mechanism locks in place both the axe and the shovel when the axe is in closed position and the shovel is in a first open position of 90 degrees relative to a handle of said multi-purpose apparatus; and
(iv) a fourth position in which said locking mechanism locks in place both the axe and the shovel when the axe is in closed position and the shovel is in a second open position of 180 degrees relative to a handle of said multi-purpose apparatus.

5. The locking mechanism of claim 1, further comprising:
a rotatable latch element (113), mounted on top of said rotatable elongated lever (112), and reaching downwardly around and under said locking bar (111), wherein the rotatable latch element (113) is switchable between at least two latch positions that comprise:
(I) a first, secured, latch position which fixedly secures the rotatable elongated lever (112) and prevents the rotatable elongated lever (112) from rotating; and
(II) a second, released, latch position which allows the rotatable elongated lever (112) to rotate.

6. The locking mechanism of claim 5,
wherein the rotatable latch element (113) and the rotatable elongated lever (112) share a same plane of rotation.

7. The locking mechanism of claim 5,
wherein the rotatable latch element (113) and the rotatable elongated lever (112) share a same plane of rotation;
wherein the rotatable latch element (113) is capable of rotating along said plane of rotation regardless of whether the rotatable elongated lever (112) is secured or unsecured.

8. The locking mechanism of claim 5,
wherein the rotatable latch element (113) and the rotatable elongated lever (112) share a same plane of rotation;
wherein the rotatable latch element (113) is capable of rotating along said plane of rotation regardless of whether the rotatable elongated lever (112) is secured or unsecured;
wherein the rotatable elongated lever (111) is capable of rotating along said plane of rotation only when said rotatable latch element (112) is in a released latch position.

9. The locking mechanism of claim 1,
wherein both the rotatable latch element (113) and the rotatable elongated lever (112) are able to rotate along a first, same, plane of rotation;
wherein only the rotatable latch element (113), and not the rotatable elongated lever (112), is able to also rotate along a second plane of rotation that is generally perpendicular to said first plane of rotation.

10. The locking mechanism of claim 1,
wherein an anchor of rotation of the rotatable elongated lever (112) is adjacent to a hammer head tool of said multi-purpose apparatus.

11. The locking mechanism of claim 1,
wherein the locking bar (111) and the rotatable elongated lever (112) form together a T-shaped locking element.

12. The locking mechanism of claim 1,
wherein the locking bar (111) and the rotatable elongated lever (112) form together a T-shaped locking element;
wherein the latch element (113) forms a T-shaped securing element.

13. The locking mechanism of claim 1,
wherein the locking bar (111) is capable of entering into, and exiting from, a cavity in a rotating element of the multi-purpose apparatus that rotates at least one of the first tool and the second tool.

14. The locking mechanism of claim 1,
wherein the locking bar (111) is capable of entering into, and exiting from, a cavity in a rotating element of the multi-purpose apparatus that rotates at least one of the first tool and the second tool;
wherein the locking bar (111) autonomously slides into said cavity upon rotation of said rotation element of the multi-purpose apparatus, and causes locking of the first tool at an open position while also locking the second tool at a closed position.

15. The locking mechanism of claim 1,
wherein the locking bar (111) prevents the first tool and the second tool from concurrently being at open positions.

16. A multi-purpose apparatus, comprising:
at least a first tool and a second tool, and a locking mechanism;
wherein the first tool is mechanically rotatable from being at a first position to being in a second position,
wherein the second tool is mechanically rotatable from being at a first position to being in a second position;
wherein the locking mechanism comprises: a rotatable elongated lever (112) that is connected perpendicularly to a locking bar (111);
wherein said locking mechanism is switchable among at least three different operational positions which comprise at least:
(i) a first position in which said locking mechanism locks in place both the first tool and the second tool when the first tool and the second tool are in closed positions; and
(ii) a second position in which said locking mechanism locks in place both the first tool and the second tool when the first tool is in open position and the second tool is in closed position; and
(iii) a third position in which said locking mechanism locks in place both the first tool and the second tool when the first tool is in closed position and the second tool is in open position.

17. The multi-purpose apparatus of claim 16,
wherein the first tool is a folding axe,
wherein the second tool is a folding shovel or a folding spade.

18. The multi-purpose apparatus of claim 16,
wherein the first tool is a folding axe,
wherein the second tool is a folding shovel or a folding spade,
wherein the multi-purpose apparatus further comprises a hammer head having a cavity;
wherein said cavity of said hammer head hosts therein at least a portion of said locking mechanism.

19. The multi-purpose apparatus of claim 16,
wherein the first tool is a folding axe facing towards a first direction,
wherein the second tool is a folding shovel or a folding spade that is facing towards a second direction which is opposite to said first direction;
wherein the multi-purpose apparatus further comprises a hammer head facing towards said second direction and having a cavity;
wherein said cavity of said hammer head hosts therein at least a portion of said locking mechanism.

20. The multi-purpose apparatus of claim 16,
wherein the multi-purpose apparatus further comprises a hammer head having a cavity;

wherein said cavity of said hammer head hosts therein at least a portion of said locking mechanism.

* * * * *